(12) United States Patent
Al Sayeed et al.

(10) Patent No.: US 10,965,373 B1
(45) Date of Patent: Mar. 30, 2021

(54) HANDLING BAND SPECTRUM FAILURES IN A C+L BAND PHOTONIC LINE SYSTEM

(71) Applicant: Ciena Corporation, Hanover, MD (US)

(72) Inventors: Choudhury A. Al Sayeed, Stittsville (CA); Yanping Xu, Ottawa (CA); David C. Bownass, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/734,472

(22) Filed: Jan. 6, 2020

(51) Int. Cl.
*H04B 10/079* (2013.01)

(52) U.S. Cl.
CPC ..... *H04B 10/0797* (2013.01); *H04B 10/0793* (2013.01); *H04B 10/07955* (2013.01)

(58) Field of Classification Search
CPC ............ H04B 10/0797; H04B 10/0793; H04B 10/07955; H04B 10/17; G02B 6/02; G02B 6/28; H04J 14/02; H04W 24/00
USPC .......................................................... 398/188
See application file for complete search history.

(56) References Cited

U.S. PATENT DOCUMENTS

| | | | |
|---|---|---|---|
| 6,310,716 B1 * | 10/2001 | Evans | H01S 3/302 359/334 |
| RE41,610 E * | 8/2010 | Eiselt | H04B 10/07955 385/24 |
| 7,872,794 B1 * | 1/2011 | Minelly | H04B 10/291 359/341.31 |
| 8,364,036 B2 | 1/2013 | Boertjes et al. | |
| 8,509,621 B2 | 8/2013 | Boertjes et al. | |
| 9,252,913 B2 | 2/2016 | Al Sayeed et al. | |
| 9,344,191 B2 * | 5/2016 | Al Sayeed | H04J 14/0221 |
| 9,419,708 B2 | 8/2016 | Rad et al. | |
| 9,496,980 B2 | 11/2016 | Bhatnagar et al. | |
| 9,577,763 B2 | 2/2017 | Al Sayeed et al. | |
| 9,729,265 B2 | 8/2017 | Hurley et al. | |
| 9,768,902 B2 | 9/2017 | Al Sayeed et al. | |
| 9,774,392 B2 | 9/2017 | Doucet et al. | |
| 9,806,803 B2 | 10/2017 | Bownass et al. | |
| 9,882,634 B1 | 1/2018 | Al Sayeed et al. | |
| 9,906,294 B2 | 2/2018 | Al Sayeed et al. | |
| 9,918,148 B2 | 3/2018 | Swinkels et al. | |
| 9,973,295 B2 | 5/2018 | Al Sayeed et al. | |
| 9,985,726 B1 | 5/2018 | Al Sayeed et al. | |

(Continued)

*Primary Examiner* — Abbas H Alagheband
(74) *Attorney, Agent, or Firm* — Clements Bernard Walker; Lawrence A. Baratta, Jr.; Christopher L. Bernard

(57) ABSTRACT

Systems and methods are provided for controlling one or more optical amplifiers of a C+L band photonic line system of a telecommunications network in which C-band signals and L-band signals may be transmitted. In one implementation, a control device may include a processing device and a memory device configured to store a traffic managing module for controlling C-band and the L-band traffic in the photonic line system. The traffic managing module, when executed, may be configured to cause the processing device to calculate a gain correction profile based on a difference between a saved baseline transmission profile and a measured transmission profile of a surviving band of a photonic line system when another band of the photonic line system is missing or impacted. The traffic managing module is configured to apply the gain correction profile to a respective optical amplifier of the photonic line system to compensate for the difference.

17 Claims, 30 Drawing Sheets

(56) References Cited

U.S. PATENT DOCUMENTS

| | | | |
|---|---|---|---|
| 9,986,317 B1 | 5/2018 | Al Sayeed et al. | |
| 10,050,737 B1 | 8/2018 | Al Sayeed et al. | |
| 10,063,313 B1 | 8/2018 | Al Sayeed et al. | |
| 10,142,022 B1 | 11/2018 | Harley et al. | |
| 10,237,633 B2 | 3/2019 | Chedore et al. | |
| 10,340,649 B2 * | 7/2019 | Yaman | H01S 3/2383 |
| 10,439,709 B1 | 10/2019 | Al Sayeed et al. | |
| 10,439,751 B2 | 10/2019 | Roberts et al. | |
| 10,491,324 B2 | 11/2019 | Al Sayeed et al. | |
| 10,567,081 B2 * | 2/2020 | Mori | H04J 14/0278 |
| 10,784,980 B2 * | 9/2020 | Roberts | H04J 14/0275 |
| 2011/0116159 A1 * | 5/2011 | Wysocki | H01S 3/06758 359/337.1 |
| 2018/0234749 A1 * | 8/2018 | Chedore | H04J 14/0212 |
| 2018/0267266 A1 * | 9/2018 | Yilmaz | H04J 14/0221 |
| 2019/0173602 A1 | 6/2019 | Al Sayeed et al. | |
| 2019/0215090 A1 * | 7/2019 | Dangui | H04B 10/2941 |
| 2019/0253361 A1 | 8/2019 | Mackay et al. | |
| 2019/0356407 A1 | 11/2019 | Al Sayeed et al. | |
| 2020/0119812 A1 * | 4/2020 | Nakamura | H04J 14/0256 |
| 2020/0153533 A1 * | 5/2020 | Yilmaz | H04J 14/0201 |

* cited by examiner

250

252

US 10,965,373 B1

HANDLING BAND SPECTRUM FAILURES IN A C+L BAND PHOTONIC LINE SYSTEM

TECHNICAL FIELD

The present disclosure generally relates to networking systems and methods. More particularly, the present disclosure relates to handling band spectrum failures in a C+L band photonic line system.

BACKGROUND

In a telecommunications network, optical signals may be transmitted over optical fiber spans between nodes. Although optical fibers are configured to enable the optical signals to be transmitted over great distances, the optical fibers are only able to transmit the optical signals up to a certain distance. Therefore, it is often necessary to include optical amplifiers between two adjacent nodes if the distance between the nodes is greater than a certain threshold.

Many optical systems include transmission of signals in the C-band, which includes wavelengths in the range from about 1530 nm to 1565 nm. In order to increase the capacity of optical fibers, telecommunications network have been developed to enable communication in a range that extend beyond the C-band. For example, some optical systems may be configured to operate in the C+L band, which includes wavelengths in both the C-band (i.e., wavelengths from about 1530 nm to 1565 nm) and the L-band (i.e., wavelengths from about 1565 nm to 1625 nm). Many C+L band photonic systems handle the processing of different bands using different equipment. For instance, a photonic line system may include optical amplifiers having a C-band amplifying device for handling C-band signals and a separate L-band amplifying device of handling L-band signals.

If problems arise in one set of components for transmitting one band (e.g., either the C-band or the L-band), typically the signals in the other band will be negatively influenced such that these signals cannot carry traffic or experience transient traffic impacts. Therefore, there is a need in the field of optical systems to allow an optical system to continue operating in a remaining band, even if one of the bands is missing, impacted, failed, etc.

BRIEF SUMMARY

The present disclosure is directed to systems and methods for measuring power loss of a surviving band (e.g., either the C-band or L-band) of a photonic line system operating within the C-band and L-band when the other band (e.g., either the L-band or the C-band) is missing (or absent or dead) or otherwise impacted in such a way that makes the complete band or some part of the band unusable. In one embodiment, a control device is described in the present disclosure for controlling an optical amplifier of a C+L band photonic line system. The control device may include a processing device and a memory device configured to store a C+L traffic managing module for controlling C-band and the L-band traffic in the C+L band photonic line system. The C+L traffic managing module, when executed, is configured to cause the processing device to calculate a gain correction profile based on a difference between a saved baseline transmission profile and a measured transmission profile of a surviving band of a C+L band photonic line system when another band of the C+L band photonic line system is missing or impacted. The transmission profile for a fiber span is the difference between a launch power spectrum profile at an input of the fiber span and the received power spectrum profile at the output of the fiber span. The C+L traffic managing module is further configured to cause the processing device to apply the gain correction profile to a respective optical amplifier of the C+L band photonic line system to compensate for the difference.

According to another embodiment of the present disclosure, a method includes the step of calculating a gain correction profile based on a difference between a saved baseline transmission profile and a measured transmission profile of a surviving band of a C+L band photonic line system when another band of the C+L band photonic line system is missing or impacted. The method also includes the step of applying the gain correction profile to a respective optical amplifier of the C+L band photonic line system to compensate for the difference.

According to yet another embodiment, the present disclosure describes a non-transitory computer-readable medium configured to store computer logic having instructions that, when executed, cause one or more processing devices to perform certain functions. For example, the computer logic may be configured to cause the one or more processing devices to calculate a gain correction profile based on a difference between a saved baseline transmission profile and a measured transmission profile of a surviving band of a C+L band photonic line system when another band of the C+L band photonic line system is missing or impacted. The computer logic may also be configured to cause the one or more processing devices to apply the gain correction profile to a respective optical amplifier of the C+L band photonic line system to compensate for the difference.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1A:
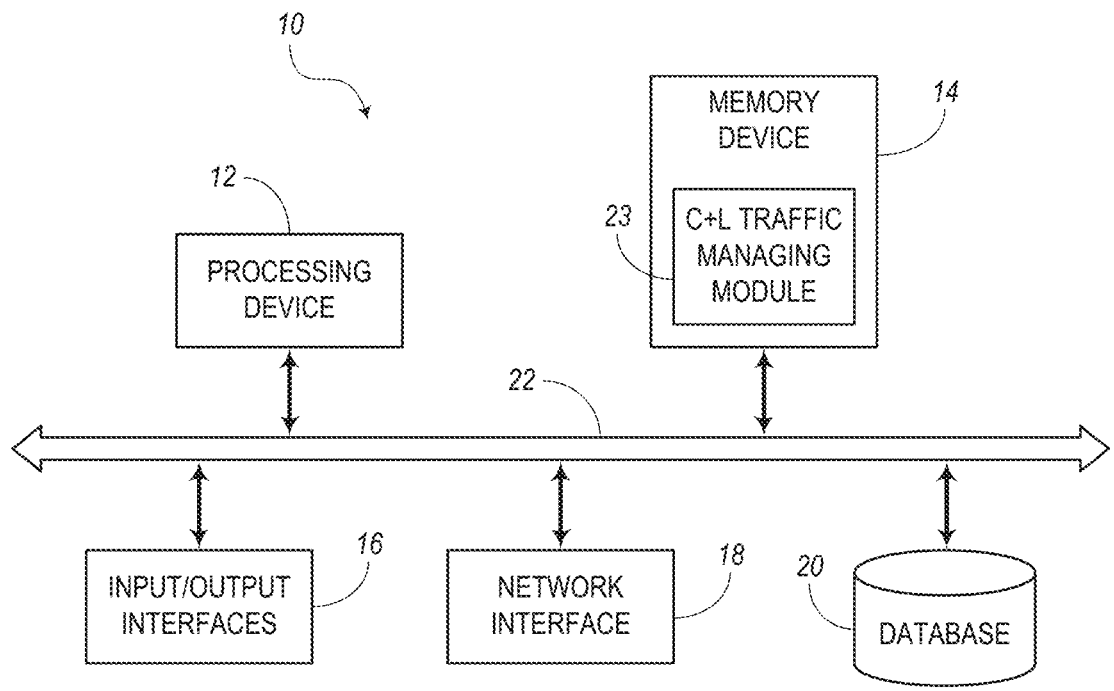
FIG. 1A is a block diagram illustrating a control device for controlling components of a photonic line system, according to various embodiments of the present disclosure.

The present disclosure focuses on optical amplifiers specific to C-band and L-band and focuses on monitoring spectrum failures in a C+L band photonic line system, where C-band and L-band spectrum is amplified and monitored by optical components that are specific to the individual C- and L-bands. According to some embodiments, the optical amplifiers may be Erbium-Doped Fiber Amplifiers (EDFAs).

In a C+L band photonic line system, any band-specific failure (e.g., band-specific amplifier failure, missing spectrum, dead spectrum, etc.) may be catastrophic for the traffic channels in the surviving band. This is due primarily to Stimulated Raman Scattering (SRS) shifts and tilt changes coming from the fiber-span transmission system (such as C-band spectrum dying while traffic is present in L-band). According to some embodiments, systems and methods of the present disclosure may provide a local control solution to recover affected traffic in the surviving band in a fast and efficient way. The traffic recovery processes may be performed with reduced dependency on east-west communications.

The present disclosure relies on the abilities of optical amplifiers (for each of C-band and L-band) to monitor a spectrum power profile (or profile tilt) at the input and/or output of the optical amplifiers. The spectrum power profile can be used to derive a baseline transmission profile for the preceding fiber span, following link-calibration or optimization for a given spectral loading condition.

The systems and methods of the present disclosure can detect band-specific hardware failures as well as silent failures. This information can be used as a trigger to re-evaluate the transmission profile changes of the preceding fiber-span from the previously saved baseline. The transmission profile changes can be applied as a "gain-profile" correction for the rest of the amplifiers in the surviving band.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a block diagram illustrating an embodiment of a control device 10 for operating in a telecommunications network to control optical amplifiers along a photonic line system. In some embodiments, the control device 10 may be configured to operate locally with a single optical amplifier for controlling the optical amplifier as described in the present disclosure. In other embodiments, the control device 10 may be configured to operate globally on an entire photonic line system of a telecommunications network and may coordinate one or more local controllers for controlling individual optical amplifiers to maintain substantially consistent spectral density characteristics even when there is a fault in the photonic line system. For example, an end-to-end Optical Multiplex Section (OMS) level sectional controller (e.g., control device 10) may require valid communications in all fiber spans within the OMS from its head to tail. Compared to a sectional controller, a nodal controller may have dependency for certain data or parameters from only immediate upstream or downstream span, and still can run independent of other nodal controllers present in the section.

In the illustrated embodiment, the control device 10 may be a digital computer that, in terms of hardware architecture, generally includes a processing device 12, a memory device 14, input/output (I/O) interfaces 16, a network interface 18, and a database 20. The memory device 14 may include a data store, database (e.g., database 20), or the like. It should be appreciated by those of ordinary skill in the art that FIG. 1 depicts the control device 10 in a simplified manner, where practical embodiments may include additional components and suitably configured processing logic to support known or conventional operating features that are not described in detail herein. The components (i.e., 12, 14, 16, 18, 20) are communicatively coupled via a local interface 22. The local interface 22 may be, for example, but not limited to, one or more buses or other wired or wireless connections. The local interface 22 may have additional elements, which are omitted for simplicity, such as controllers, buffers, caches, drivers, repeaters, receivers, among other elements, to enable communications. Further, the local interface 22 may include address, control, and/or data connections to enable appropriate communications among the components 12, 14, 16, 18, 20.

The processing device 12 is a hardware device adapted for at least executing software instructions. The processing device 12 may be any custom made or commercially available processor, a central processing unit (CPU), an auxiliary processor among several processors associated with the control device 10, a semiconductor-based microprocessor (in the form of a microchip or chip set), or generally any device for executing software instructions. When the control device 10 is in operation, the processing device 12 may be configured to execute software stored within the memory device 14, to communicate data to and from the memory device 14, and to generally control operations of the control device 10 pursuant to the software instructions.

It will be appreciated that some embodiments of the processing device 12 described herein may include one or more generic or specialized processors (e.g., microprocessors, Central Processing Units (CPUs), Digital Signal Processors (DSPs), Network Processors (NPs), Network Processing Units (NPUs), Graphics Processing Units (GPUs), Field Programmable Gate Arrays (FPGAs), and the like). The processing device 12 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 16 may be used to receive user input from and/or for providing system output to one or more devices or components. User input may be provided via, for example, a keyboard, touchpad, a mouse, and/or other input receiving devices. The system output may be provided via a display device, monitor, graphical user interface (GUI), a printer, and/or other user output devices. I/O interfaces 16 may include, for example, a serial port, a parallel port, a small computer system interface (SCSI), a serial ATA (SATA), a fiber channel, InfiniBand, iSCSI, a PCI Express interface (PCI-x), an infrared (IR) interface, a radio frequency (RF) interface, and/or a universal serial bus (USB) interface.

The network interface 18 may be used to enable the control device 10 to communicate over a network, such as a photonic line system (as described below with respect to FIG. 2), a telecommunications network, the Internet, a wide area network (WAN), a local area network (LAN), and the like. The network interface 18 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 18 may include address, control, and/or data connections to enable appropriate communications on the telecommunications network.

The memory device 14 may include volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the memory device 14 may incorporate electronic, magnetic, optical, and/or other types of storage media. The memory device 14 may have a distributed architecture, where various components are situated remotely from one another, but can be accessed by the processing device 12. The software in memory device 14 may include one or more software programs, each of which may include an ordered listing of executable instructions for implementing logical functions. The software in the memory device 14 may also include a suitable operating system (O/S) and one or more computer programs. The operating system (O/S) essentially controls the execution of other computer programs, and provides scheduling, input-output control, file and data management, memory management, and communication control and related services. The computer programs may be configured to implement the various processes, algorithms, methods, techniques, etc. described herein. The memory device 14 may further store a computer program, such as a C+L traffic managing module 23, configured to manage traffic in a C+L band photonic line system, as described in more detail below.

The memory device 14 may include a data store used to store data. In one example, the data store may be located internal to the control device 10 and may include, for example, an internal hard drive connected to the local interface 22 in the control device 10. Additionally, in another embodiment, the data store may be located external to the control device 10 and may include, for example, an external hard drive connected to the I/O interfaces 16 (e.g., SCSI or USB connection). In a further embodiment, the data store may be connected to the control device 10 through a network and may include, for example, a network attached file server.

Moreover, some embodiments may include a non-transitory computer-readable storage medium having computer readable code stored in the memory device 14 for programming the control device 10 or other processor-equipped computer, server, appliance, device, circuit, etc., to perform functions as described herein. Examples of such non-transitory computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by the processing device 12 that, in response to such execution, cause the processing device 12 to perform a set of operations, steps, methods, processes, algorithms, functions, techniques, etc. as described herein for the various embodiments.

Figure 1B:
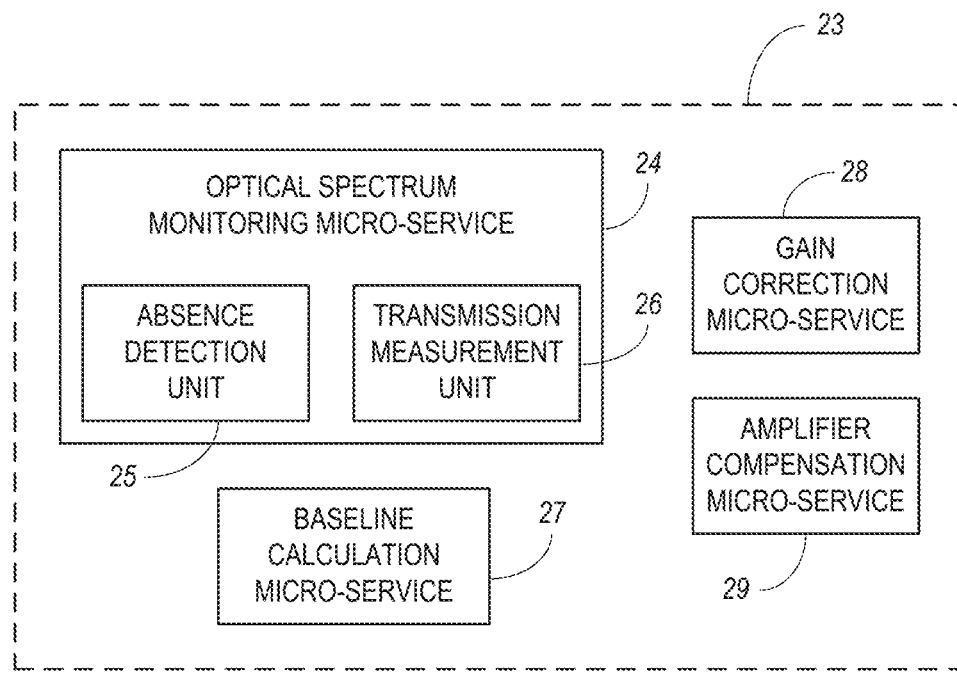
FIG. 1B is a block diagram illustrating a C+L traffic managing module, as shown in FIG. 1A, for managing the traffic of the photonic line system, according to various embodiments of the present disclosure.

FIG. 1B is a block diagram illustrating an embodiment of the C+L traffic managing module 23 shown in FIG. 1A. The C+L traffic managing module 23 may include computer logic or instructions for causing the processing device 12 to perform certain functionality with respect to managing traffic in a photonic line system. More particularly, when a fault is detected on one part of a photonic line system which causes one of the C-band or L-band to be absent, then the C+L traffic managing module 23 may be configured to control the signals in the other (surviving) band to compensate for any negative consequences of the signals from the other band being absent or impacted in such a way that there will also be negative influences on the surviving band.

As described in the present disclosure, examples are shown where an entire band (e.g., one of the C-band or L-band) is completely missing. However, it will be recognized by one of ordinary skill in the art having a clear understanding of the present disclosure that other factors may cause negative influences on a band. For example, although a band may not be entirely absent, the band may be missing one or more channels within the band. A silent pump failure may be another example of a condition that negatively influences the band. Also, there may be other types of partial band failures or the band may experience any type of situation or condition that would have a negative impact on the band.

The C+L traffic managing module 23 is shown in FIG. 1B, according to one embodiment, with an optical channel monitoring micro-service 24, which further includes an absence detection unit 25 and a transmission measurement unit 26. The C+L traffic managing module 23 further includes a baseline calculation micro-service 27, a gain correction micro-service 28, and an amplifier compensation micro-service 29.

The optical channel monitoring micro-service 24 is configured to cause the processing device 12 to detect the presence of signals in the C-band and L-band using the absence detection unit 25. If one or both of the C-band signals and/or L-band signals are absent or missing, as a results of various types of faults, the absence detection unit 25 is configured to provide an indication of this detected absence in order that compensation can be made to handle the faults. The transmission measurement unit 26 of the optical channel monitoring micro-service 24 is a configured to measure the Power Spectrum Density (PSD) or other suitable unit of measure for defining certain levels, parameters, characteristics, etc. of the transmission profile of the fiber spans of a photonic line system. When the absence detection unit 25 detects that signals are missing on one band (e.g., the C-band) or otherwise negatively impacted, the transmission measurement unit 26 may detect the PSD of the signals on the other (surviving) band (e.g., the L-band). Furthermore, it may be noted that the detected PSD of the surviving band may be negatively influenced by the absence of the other band, and therefore the embodiments of the present disclosure are configured to compensate for this negative influence.

Before faults are detected and the photonic line system is operating in a normal fashion, baseline or "ideal" spectrum measurements can be made. The baseline calculation micro-service 27 is configured to obtain measurements of both the C-band and L-band signals, when the photonic line system is operating properly. The baseline calculation micro-service 27 is configured to save these measurements (e.g., in the database 20 or in the memory device 14) as baseline spectrum levels. Future measurements of the PSD in the C-band and L-band can then be compared to these baseline spectrum levels. For example, as mentioned above, if one of the bands is missing, the gain correction micro-service 28 may be configured to calculate a correction that may be used to alter the gain of a corresponding optical amplifier in order to compensate for the negative influences of the absence of a missing band. The amplifier compensation micro-service 29 is configured to apply the gain correction levels to the optical amplifiers to compensate for the negative influences in an attempt to get the PSD levels to (or near) the baseline spectrum levels obtained when the photonic line system was operating in a properly-functioning manner (e.g., without faults).

Figure 2:
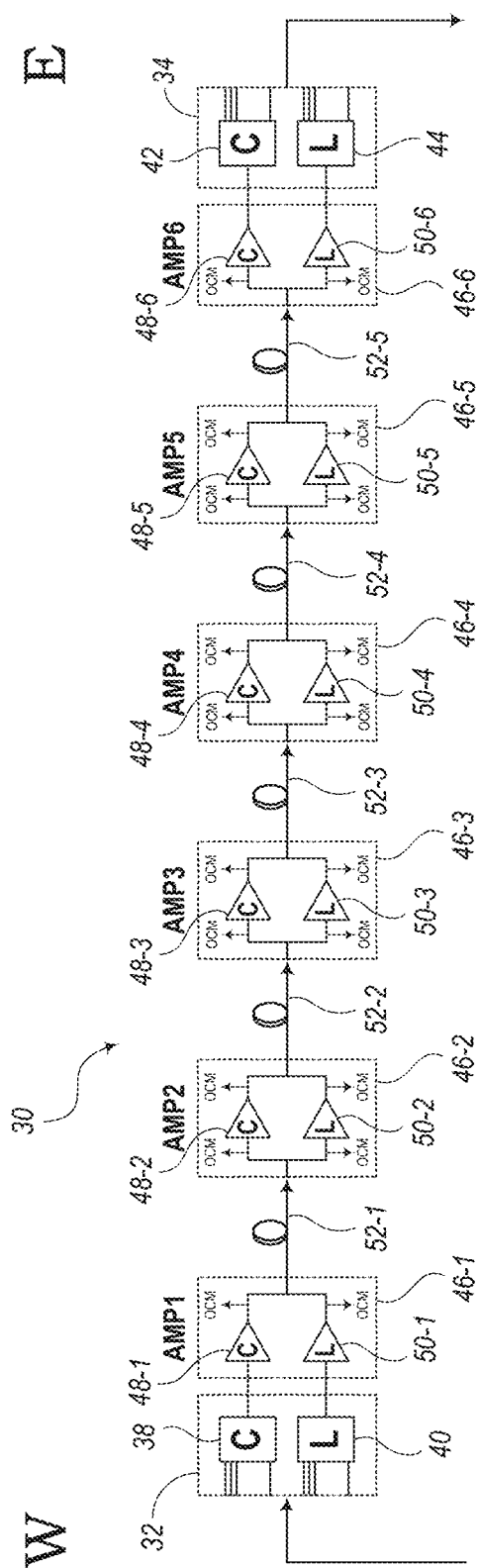
FIG. 2 is a schematic diagram illustrating a photonic line system that may continue operating when one of the two bands is missing or impacted, according to various embodiments.

FIG. 2 is a schematic diagram illustrating an embodiment of a photonic line system 30 that is configured to carry both C-band and L-band optical signals. Although FIG. 2 shows the optical signals of the photonic line system 30 being transmitted in one direction (e.g., from west (W) to east (E)), it will be understood by one of ordinary skill in the art that traffic may be transmitted bi-directionally using similar equipment and the terms "west" and "east" are used to logically describe the traffic flow, from right to left in the figures. Under normal circumstances, optical signals are conducted from a first optical multiplexer device 32 at one end (e.g., west end W) of the photonic line system 30 to a second optical multiplex device 34 at another end (e.g., east end E). In some embodiments, optical signals may be provided to multiple optical multiplex devices at multiple degrees. The first optical multiplex device 32 may include a C-band multiplexer 38 and an L-band multiplexer 40. At the other end of the photonic line system 30, the second optical multiplex device 34 may include a C-band demultiplexer 42 and an L-band demultiplexer 44.

The photonic line system 30 further includes a number of optical amplifiers 46 configured for amplifying C-band optical signals and for amplifying L-band optical signals being transmitted between the first and second optical multiplex devices 32, 34. The number of optical amplifiers 46 needed in the photonic line system 30 may depend on certain factors, such as the distance between the first optical multiplex device 32 and second optical multiplex device 34. Each optical amplifier 46 includes C-band amplifying device 48 for amplifying the C-band signals and an L-band amplifying device 50 for amplifying the L-band signals. In the illustrated embodiment, a first optical amplifier 46-1 includes a first C-band amplifying device 48-1 and a first L-band amplifying device 50-1, a second optical amplifier 46-2 includes a second C-band amplifying device 48-2 and a second L-band amplifying device 50-2, and so on. The photonic line system 30 includes optical fiber 52 between adjacent pairs of optical amplifiers 46.

If there are no faults within the photonic line system 30, optical signals can be transmitted in both the C-band and L-band and the photonic line system 30 can operate properly as it is designed. The assumption is that traffic (or optical signals) are present in both the C- and L-bands and the photonic line system 30 is optimized or calibrated either at a full-fill condition or at a partial spectral loading condition. However, if a fault is detected within the photonic line system 30, whereby signals are unable to be transmitted in either the C-band or L-band, as described in more detail below, embodiments described in the present disclosure may be configured for adjusting the gain characteristics of one or more of the optical amplifiers 46-1, 46-2, . . . , 46-6 to enable the photonic line system 30 to continue transmitting optical signals within the surviving spectral band.

Figure 3:
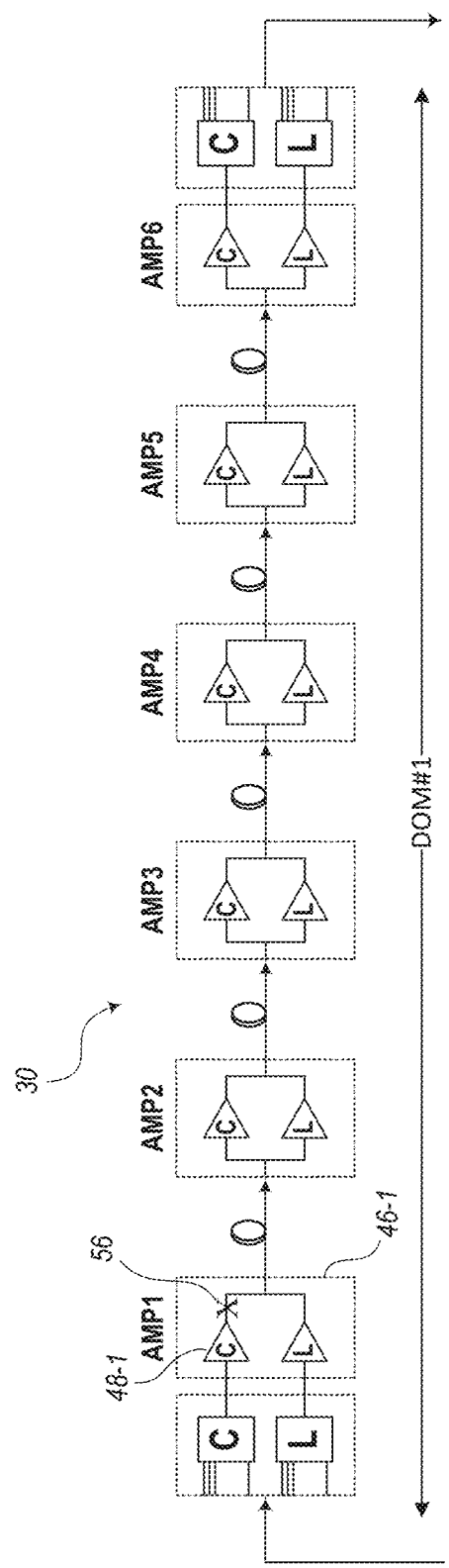
FIG. 3 is a schematic diagram illustrating the photonic line system of FIG. 2 when a fault is detected on the equipment for transmitting one of the two bands, according to various embodiments.

FIG. 3 is a schematic diagram illustrating the photonic line system 30 of FIG. 2, which may be part of a domain (e.g., DOM #1) of a telecommunications system. However, in FIG. 3, the photonic line system 30 is shown with an example fault 56 on a branch of the first optical amplifier 46-1 associated with the first C-band amplifying device 48-1. Of course, the fault can also be on the other branch in other examples. In this situation, the photonic line system 30 may be unable to transmit signals within the C-band, whereby optical signals may only be transmitted within the L-band. The fault 56 may be caused by the C-band amplifying device 48-1 developing a hardware failure or may be caused by a silent pump failure, a fiber disconnection, or other various conditions. As a result of the faults 56, the C-band amplifying device 48-1 may stop transmitting optical signals in a specific band ("C-band" in this example) to downstream fiber spans 52.

The C+L traffic managing micro-service 24 shown in FIG. 1 may be configured to control the traffic to allow the surviving traffic or optical signals present in the non-faulty band to continue transmitting optical signals, without impact. The C+L traffic managing micro-service 24 may apply a control strategy on the surviving band to recover the optical traffic. The control strategy may be a local control or a nodal control strategy and may reduce dependency on an external end-to-end control solution, which may reduce west-east communications dependency.

Throughout the present disclosure, graphs are shown representing examples of measurements taken in various photonic line systems (e.g., the photonic line system 30 shown in FIG. 2). The graphs illustrate certain measurements made at different parts of the photonic line system. For example, as shown in FIG. 2, OCMs are shown at the inputs and outputs of each of C-band amplifiers 48-1, 48-2, . . . , 48-6 and at the inputs and outputs of each of the L-band amplifiers 50-1, 50-2, . . . , 50-6 of the respective amplifiers 46-1, 46-2, . . . , 46-6. Also, OCMs are shown at the inputs and outputs of each of the fiber optic spans 52-1, 52-2, . . . , 52-5, arranged between the adjacent pairs of amplifiers 46-1, 46-2, . . . , 46-6.

The graphs shown in the present disclosure may show transmission profiles, based on the Power Spectrum Density (PSD), gain, loss, Signal-to-Noise Ratio (SNR), or other characteristics of the spectrum at a range of frequencies. As illustrated, the frequencies of interest may range from about 186 THz to about 196 THz. In particular, the exemplary graphs show a range of frequencies associated with C-band and L-band signals. The C-band includes wavelengths ranging from about 1530 nm to 1565 nm. When C-band signals are transmitted in a vacuum, the frequency of the C-band signals ranges from about 191.7 THz to about 196.1 THz and are shown on the right side of the graphs. The L-band includes wavelengths ranging from about 1565 nm to 1625 nm. When L-band signals are transmitted in a vacuum, the frequency of the L-band signals ranges from about 184.6 THz to about 191.7 THz and are shown on the left side of the graphs. It should be understood by one of ordinary skill in the art that the embodiments of the present disclosure may be utilized for communicating optical light signals or other types of radiation in any suitable frequency range. Also, it be apparent to one of ordinary skill in the art that the transmission medium will typically have a refractive index of about 1.4 to about 1.5, as opposed to the ideal refractive index of 1.0 (i.e., speed of light in a vacuum). Therefore, modifications can be made to the systems of the present disclosure to account for changes in wavelength and frequencies in the C-band and L-band due to fiber optic cable having known refractive indices.

Figure 4A:
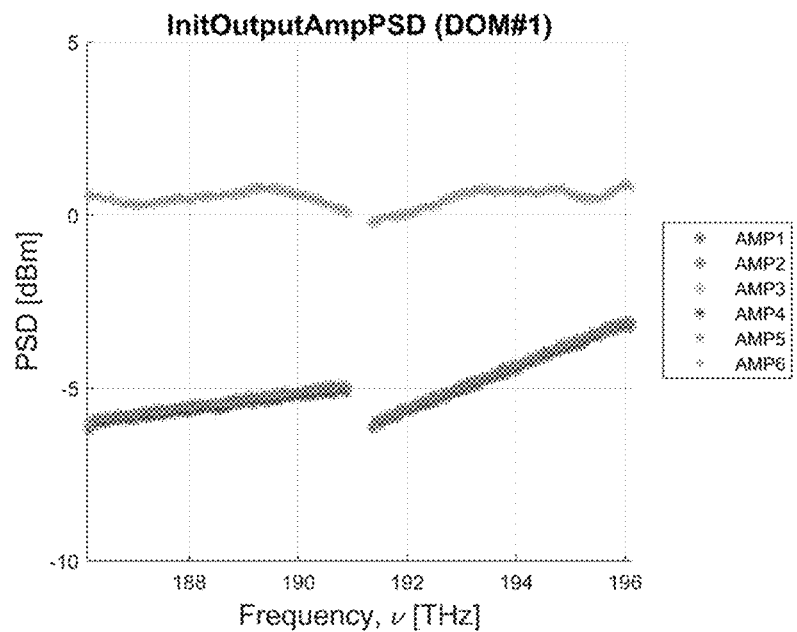
FIGS. 4a-4d are graphs illustrating measurements and calculations of Power Spectrum Density (PSD) and Signal-to-Noise Ratio (SNR) at the output of the amplifiers of the photonic line system of FIG. 2 when the C-band is missing, according to various examples.
Figure 4B:
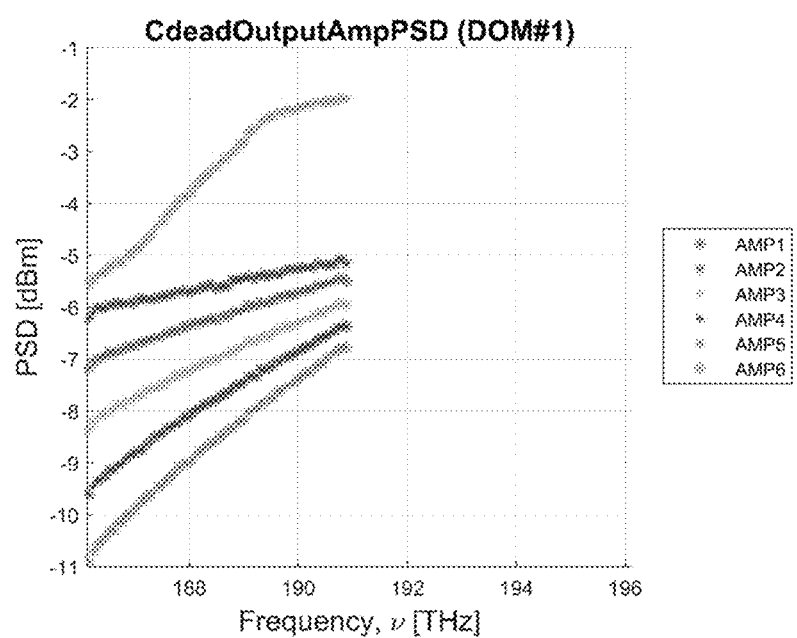
Figure 4C:
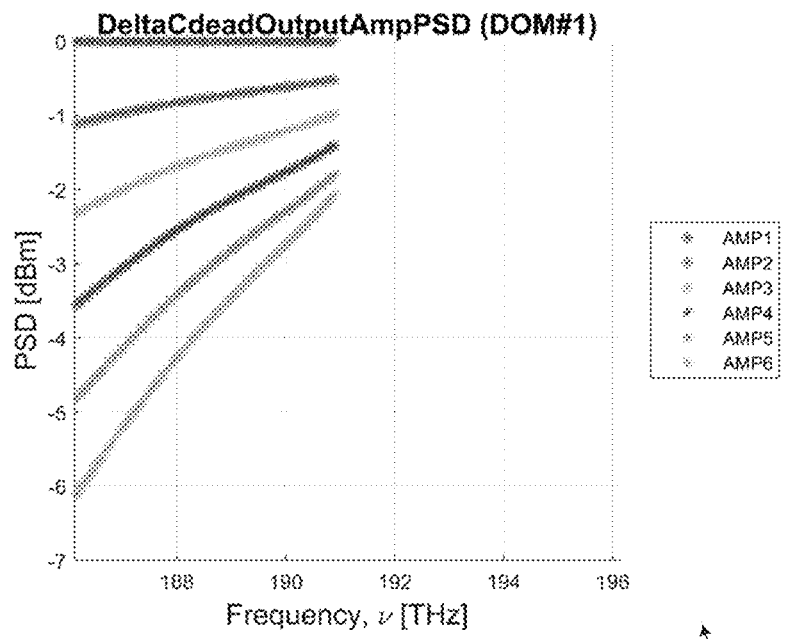
Figure 4D:
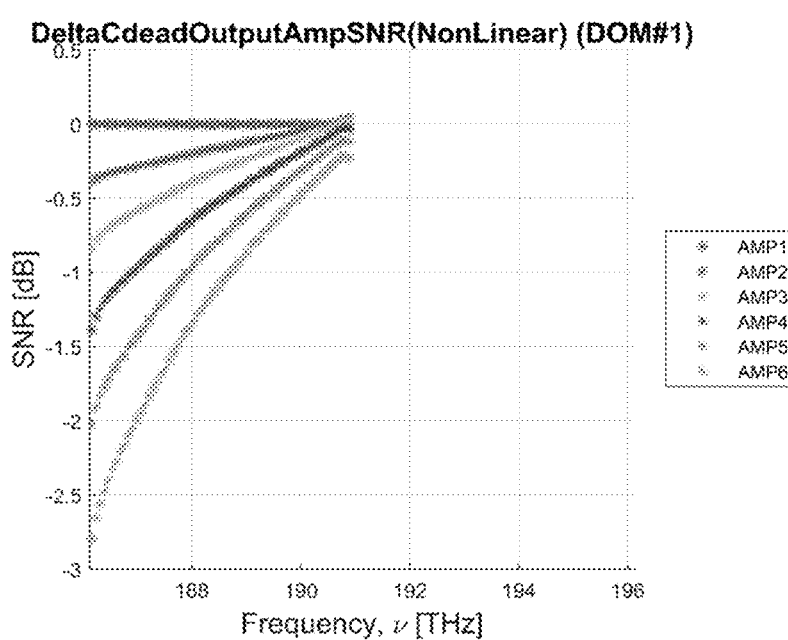

FIGS. 4*a*-4*d* are graphs 60, 62, 64, 66 illustrating the impact on surviving L-band optical signals when there is a fault on the C-band optical signal equipment, such as in the situation shown in FIG. 3 with the fault 56 detected in or near the C-band amplifying device 48-1. The graphs 60, 62, 64, 66 show frequency on the x-axis (in THz). FIGS. 4*a*-4*c* show Power Spectrum Density (PSD) of the transmission profile on the y-axis (in dBm) and FIG. 4*d* shows Signal-to-Noise Ratio (SNR) on the y-axis (in dBm). The graphs 60, 62, 64, 66 show the PSD or SNR for each of the six optical amplifiers (AMP1, AMP2, AMP3, AMP4, AMP5, AMP6), labelled 46-1, 46-2, 46-3, 46-4, 46-5, 46-6 in FIG. 2.

The graph 60 of FIG. 4*a* shows the Initial Output PSD of the Amplifiers (DOM #1). The graph 62 of FIG. 4*b* shows the Output PSD of the Amplifiers when the C-band is dead (DOM #1). The graph 64 of FIG. 4*c* shows the change (delta) in Output PSD of the Amplifiers when the C-band is dead. Also, the graph 66 of FIG. 4*d* shows the change (delta) in the SNR Output of the Amplifiers when the C-band is dead.

In a combined C+L band system (e.g., photonic line system 30), when the C-band dies, the impact on surviving L-band channels primarily comes from Stimulated Raman Scattering (SRS) and tilt as L-band optical signals (lower frequency channels) loses optically transmitted power as previously transferred from higher frequency C-band signals.

The graphs of FIGS. 4*a*-4*d* show examples of simulated power offset and SNR penalties on L-band channels in a 5× span optical multiplex section (OMS) (80 km/span, NDSF fiber in each span) when the first C-band amplifying device 48-1 in the photonic line system 30 dies. Graph 60 of FIG. 4*a* includes a launch power spectrum profile for a C+L band fully loaded calibrated or optimized system. Graph 62 of FIG. 4*b* includes a launch power spectrum profile for L-band channels when the C-band amplifier dies in an upstream span. Graph 64 of FIG. 4*c* includes a delta in launch power profile for L-band channels compared to initial launch power profile. Also, graph 66 of FIG. 4*d* includes a delta in Signal-to-Noise Ratio (SNR) considering linear and non-linear penalties for L-band channels compared to initial launch condition as shown in FIG. 4*a*.

FIGS. 5*a*-5*d* are graphs 70, 72, 74, 76 illustrating the impact on surviving C-band optical signals when equipment associated with the L-band dies. In a combined C+L system, when the L-band dies, the impact on surviving C-band channels primarily comes from Stimulated Raman Scattering (SRS) and tilt as the missing L-band optical signals (lower frequency channels) do not deplete the power from higher frequency C-band signals.

Figure 5A:
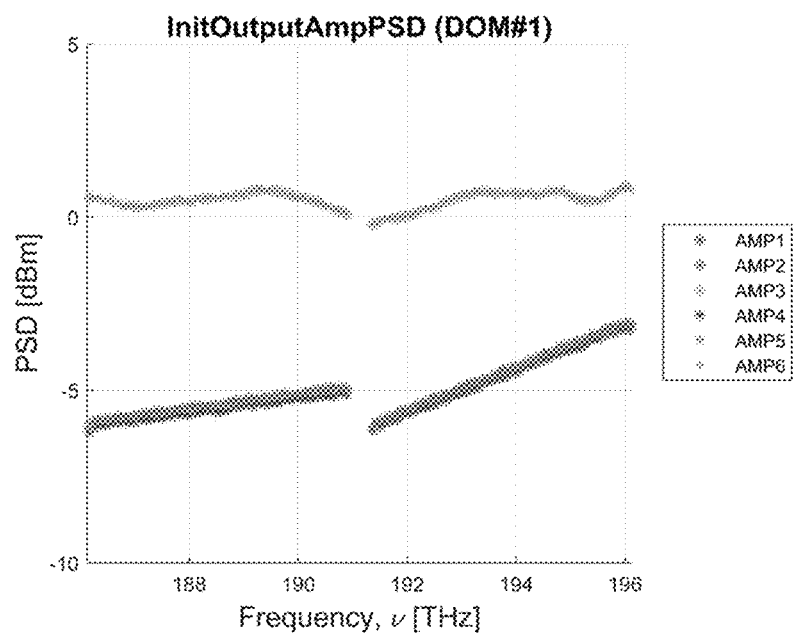
FIGS. 5a-5d are graphs illustrating measurements and calculations of PSD and SNR at the output of the amplifiers of the photonic line system of FIG. 2 when the L-band is missing, according to various examples.
Figure 5B:
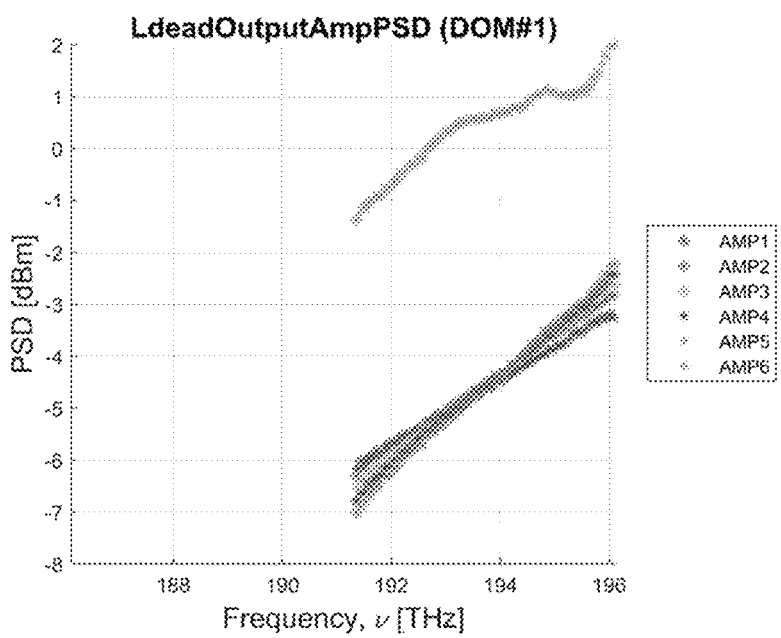
Figure 5C:
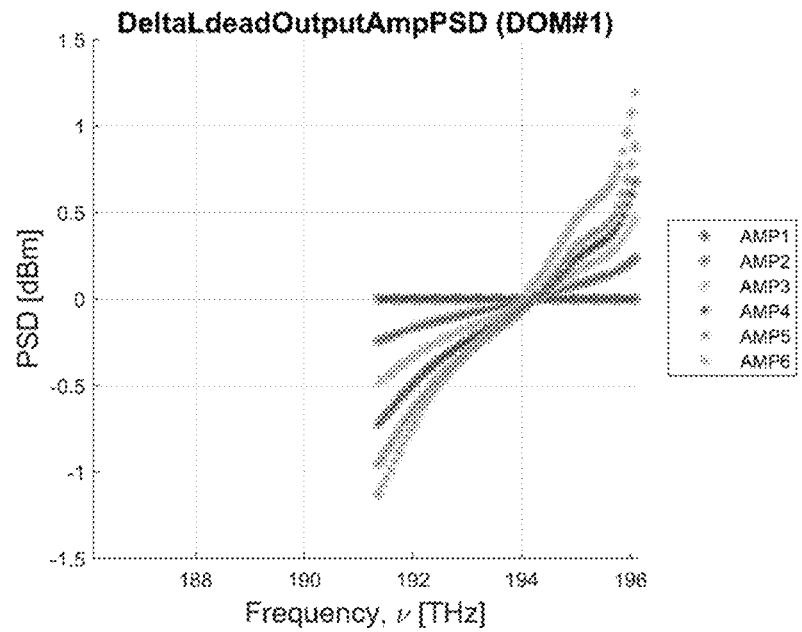
Figure 5D:
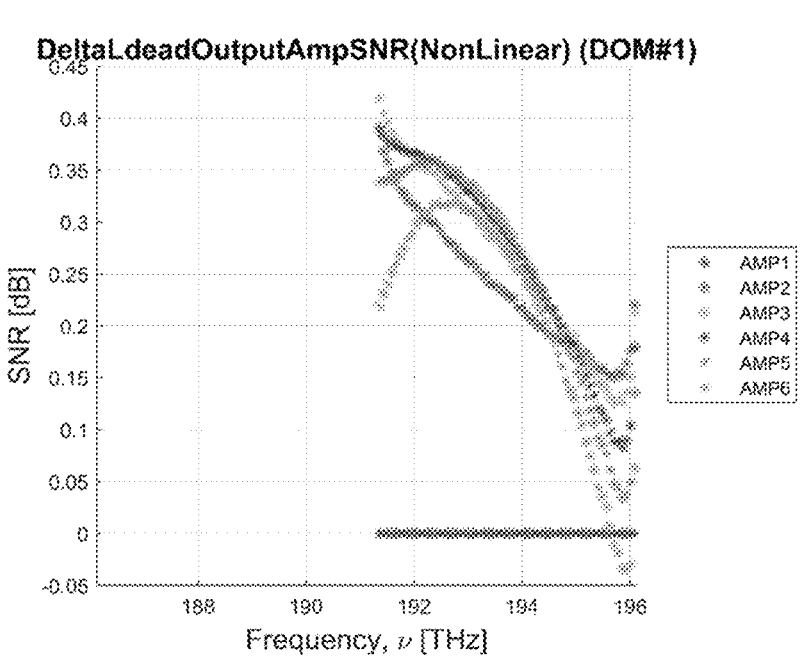

The graphs of FIGS. 5*a*-5*d* show examples of simulated power offset, tilt, and SNR penalties on C-band channels in a 5× span Optical Multiplex Section (OMS) (80 km/span, NDSF fiber in each span) when the first L-band amplifying device 50-1 in the photonic line system 30 dies. Graph 70 of FIG. 5*a* illustrates a launch power spectrum profile for a C+L band fully loaded calibrated or optimized system. Graph 72 of FIG. 5*b* illustrates a launch power spectrum profile for C-band channels when the L-band amplifier dies in an upstream span. Graph 74 of FIG. 5*c* illustrates a delta in launch power profile for C-band channels compared to initial launch power profile. Also, graph 76 of FIG. 5*d* illustrates a change (delta) in SNR considering linear and non-linear penalties for C-band channels compared to initial launch condition as shown in FIG. 5*a*.

Therefore, the C+L traffic managing micro-service 24 may operate according to the following functions. When a band of optical signals dies, the C+L traffic managing micro-service 24 determines if the dead optical band is the higher frequency band or the lower frequency band.

If the higher frequency band dies, the signals at the lower frequency band take most of the impact (e.g., a 3 dB SNR impact over a 5× span section on L-band channels). When the lower frequency band dies, the signals at the higher frequency band mostly get a tilt in spectrum, but the overall SNR impact from a single section point of view (5× typical 80 km spans) may not be significant. In both cases, it is assumed that if the spectrum power loses in an upstream section, on the next downstream section (the next downstream OADM mux), the missing band can be replaced with Amplified Spontaneous Emission (ASE) channel holders to stop the propagation of penalties further downstream. However, replacing with ASE channel holders in a downstream section does not handle the power and SNR offsets on the surviving channels originated from an upstream section, and hence, those penalties remain and do not recover on their own.

The C+L traffic managing micro-service 24 may be configured to operate in a C+L band optical line system according to the following. The C+L traffic managing micro-service 24 may be configured to save a gain/loss transmission profile over the spectrum of each fiber span or link following initial link calibration or optimization of the photonic line system for a given spectral loading condition. The transmission profile for the fiber link is saved as a baseline for each band (C and L), considering the spectral loading for the link remains constant (i.e., either full-fill or partial-fill). In a partial fill system, a new baseline will need to be taken following new capacity changes. In an ASE channel holder loaded system, where spectrum always remain in full-fill state, a baseline that is saved following link calibration does not get affected by any capacity changes. It is assumed that at least one optical amplifier per band in the line system downstream to fault location is equipped with optical spectrum monitoring capabilities that can effectively provide the per band transmission profile for each fiber span.

In the event that one of the bands (C or L) disappears from its amplifier output or from the downstream fiber input, the control device 10 is designed to take a new gain/loss transmission profile for the preceding fiber span for the surviving band and apply the delta changes to a downstream amplifier dedicated for the surviving band. Also, the control device 10 may calculate the delta changes as an error between the previously saved baseline transmission profile and the newly measured transmission profile following the disappearance of the other band. The control device 10 may apply the delta changes to the downstream amplifier as an adjustment to its target gain profile (i.e., a change in gain, tilt and ripples (by using internal Dynamic Gain-Flattening Filter (DGFF) attenuation correction if available)).

Figure 6:
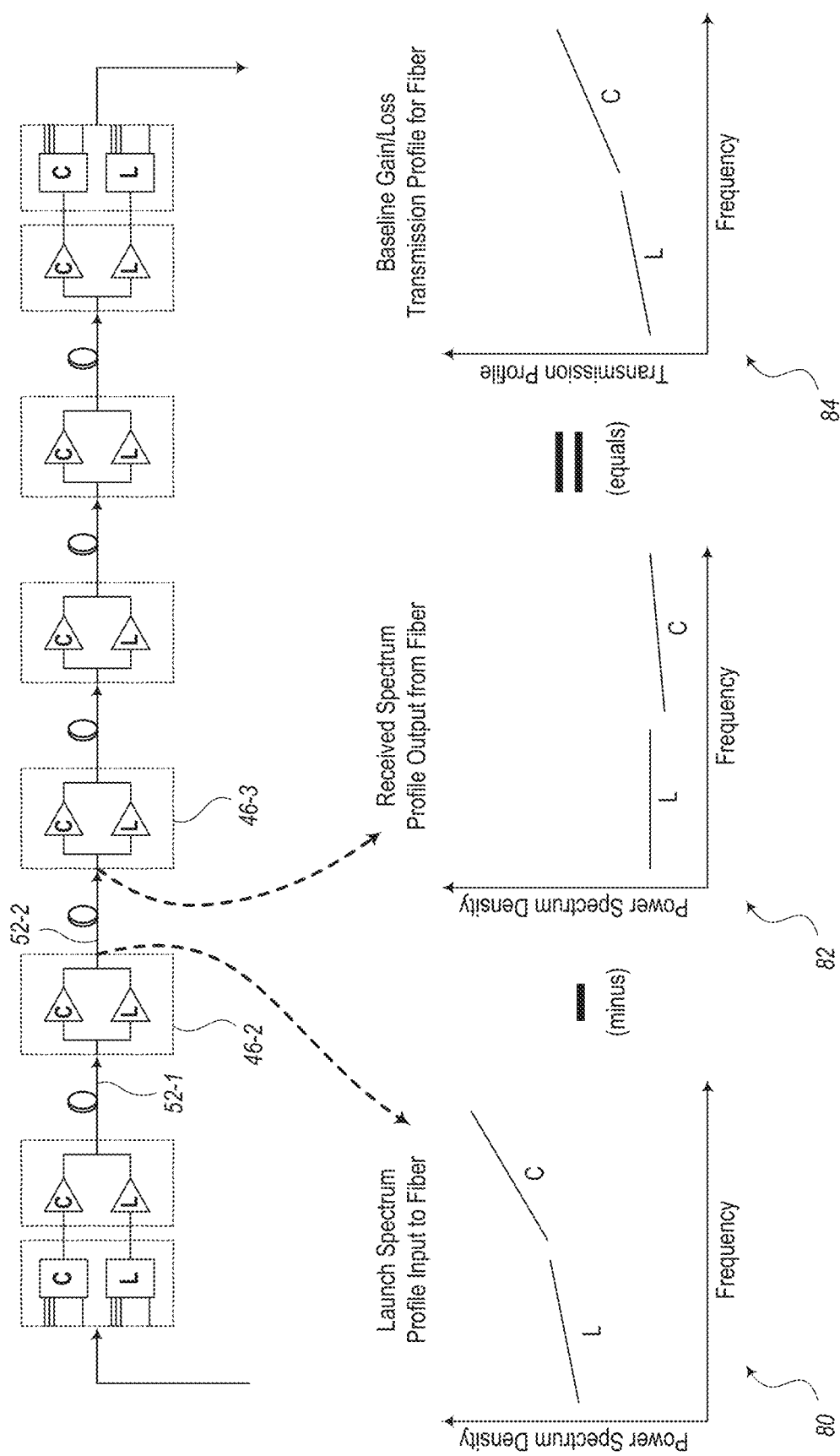
FIG. 6 is a schematic diagram and corresponding graphs for illustrating how a baseline gain/loss transmission profile for a fiber is calculated in a photonic line system, according to various embodiments of the present disclosure.

FIG. 6 shows the photonic line system 30 of FIG. 2 with a strategy for determining a baseline gain/loss transmission profile 84 for a specific portion of the optical fiber 52. In this embodiment, the profile is determined for the optical fiber 52 between the second optical amplifier (AMP2) 46-2 and the third optical amplifier (AMP3) 46-3. The system includes saving the baseline transmission profile 84 for each fiber span 52 following calibration or link optimization for a given spectral loading condition.

At the input to the optical fiber 52 of interest, a Launch Spectrum Profile 80, based on Power Spectrum Density, is detected for both the L-band frequencies and C-band frequencies. At the output from the optical fiber 52 of interest, a Received Spectrum Profile 82 is detected for both the L-band frequencies and C-band frequencies. The Baseline Gain/Loss Transmission Profile 84 for this optical fiber 52 is calculated by subtracting the Received Spectrum Profile Output 82 from the Fiber from the Launch Spectrum Profiled Input 80 to the Fiber. In this embodiment, the Baseline Transmission Profile 84 is calculated in the situation where there are no faults in the system.

Figure 7:
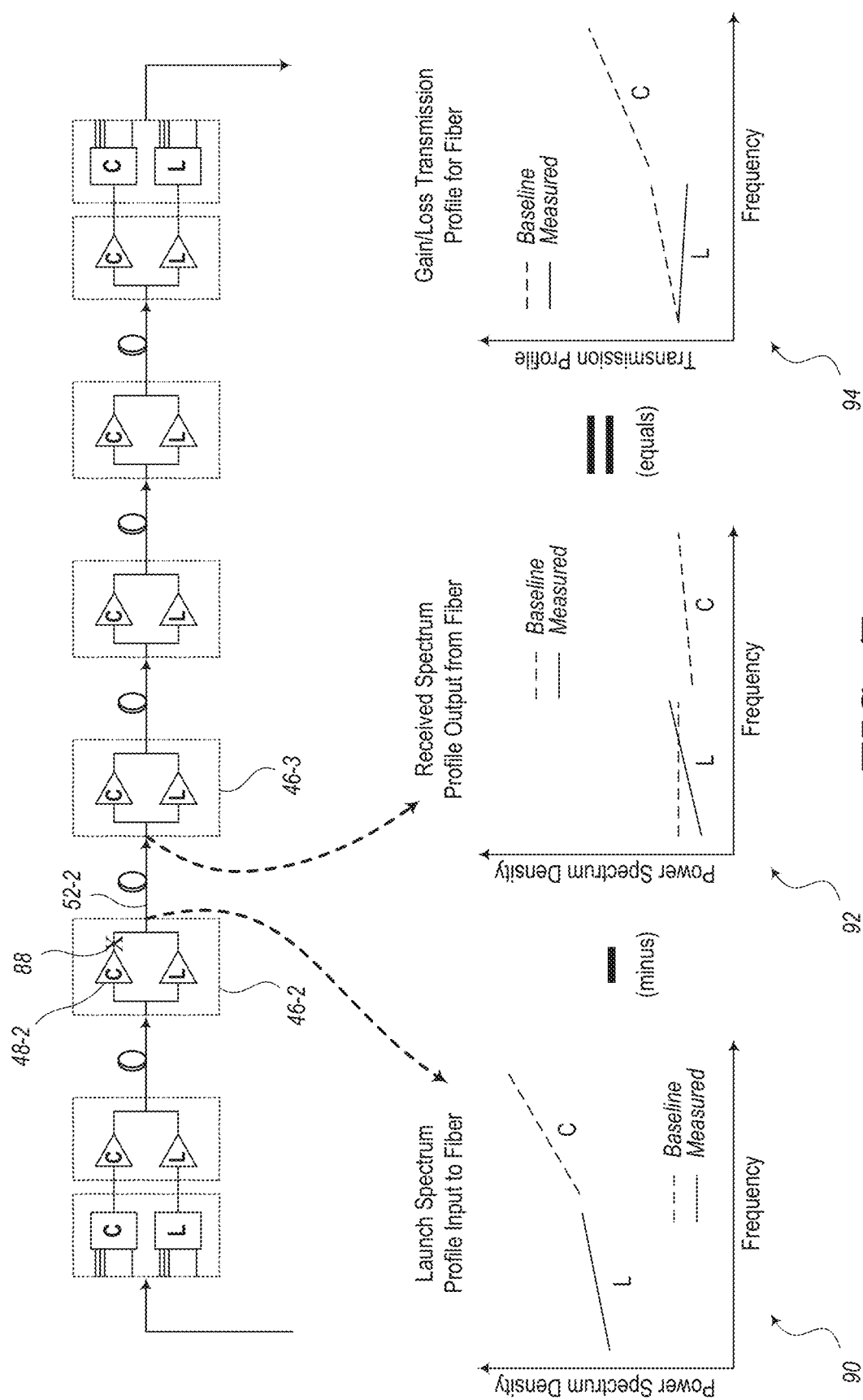
FIG. 7 is a schematic diagram and corresponding graphs for illustrating how a gain/loss transmission profile for a fiber is measured in a photonic line system, according to various embodiments of the present disclosure.

FIG. 7 shows the photonic line system 30 of FIG. 2. However, in this situation, a fault 88 is detected in or near the C-band amplifying device 48-2 of the second optical amplifier 46-2. The saved "baseline" profile information is shown in the graphs 90, 92, 94 as dashed lines. The system is configured to measure the spectrum profile, whereby the "measured" profile information is shown as solid lines in the graphs 90, 92, 94 of FIG. 7. Because of the fault 88 in the C-band equipment, the power spectrum density of the "missing" C-band does not exist in the input profile graph 90 and output profile graph 92. Regarding the surviving band (i.e., the L-band), the input profile 90 for the L-band is substantially the same as the baseline values, measured and saved in the fault-less condition of FIG. 6. However, the influence of the C-band fault can be seen in the output profile graph 92 in the L-band, which shows the measured L-band being different from the saved baseline values. Again, the baseline gain/loss transmission profile 94 for the fiber 52 can be calculated by subtracting the received spectrum 92 from the launch spectrum 90.

In case of a missing band of optical signals (e.g., missing the C-band as shown in FIG. 7), the control device 10 may be configured to compare the measured Transmission Profile 94 for the surviving band (e.g., L-band) in each fiber span 52 with previously saved baseline and applying a gain profile correction on the following amplifier specific to the surviving band. Thus, the gain profile correction (or difference between the baseline and measured L-band profiles) can be used to compensate for the inconsistencies that are experienced in the L-band when a fault is detected in the C-band hardware.

Figure 8:
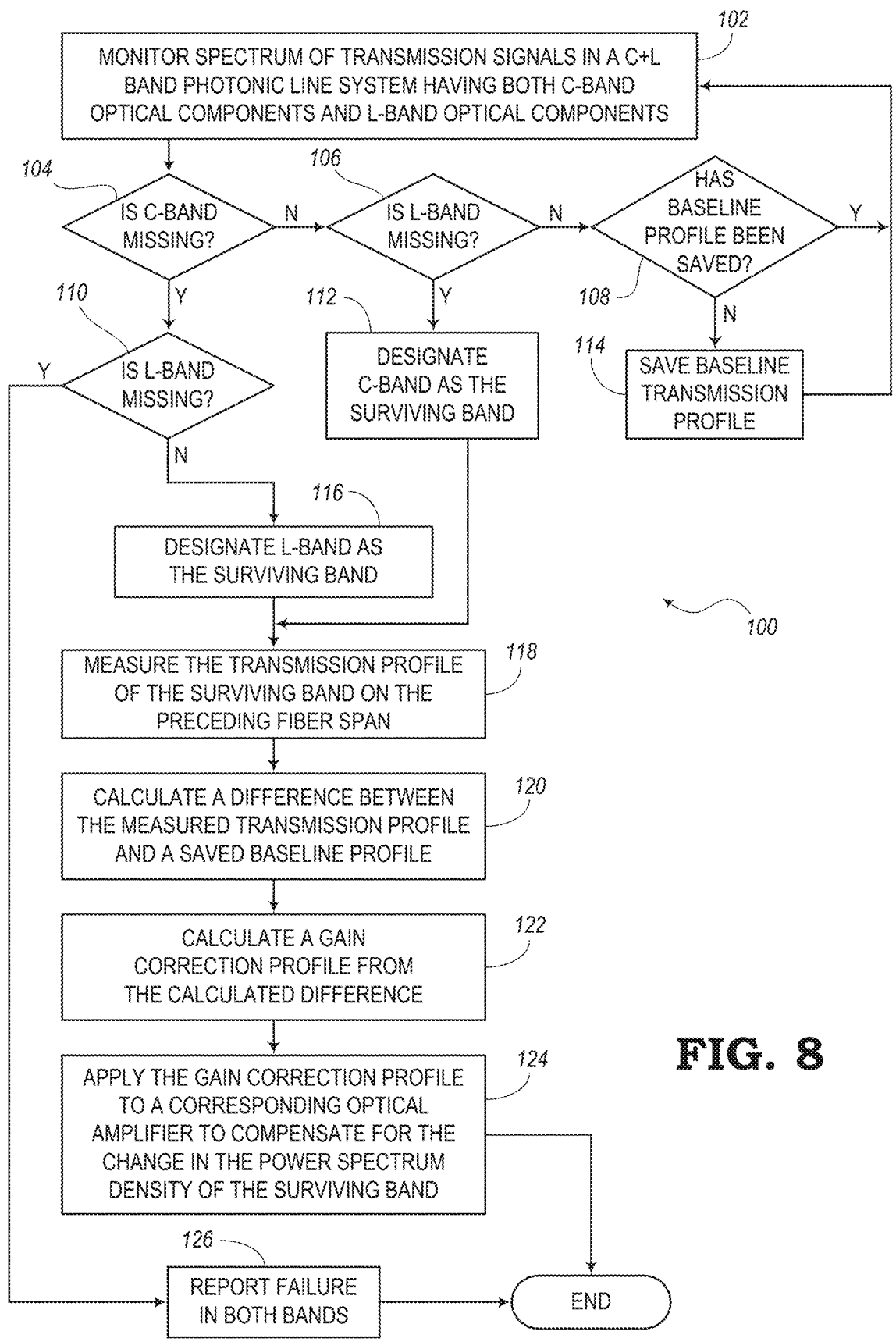
FIG. 8 is a flow diagram illustrating a method for managing traffic of a C+L band photonic line system to compensate for negative influences caused by one of the bands being missing, according to various embodiments of the present disclosure.

FIG. 8 is a flow diagram illustrating a method 100 of managing C+L traffic in a C+L band photonic line system. In this embodiment, the method 100 includes the step of monitoring the spectrum of optically transmitted signals in a C+L band photonic line system, as indicated in block 102. The C+L band photonic line system is configured to include both C-band optical components and L-band optical components. In response to monitoring the C+L band spectrum, the method 100 includes determining if the C-band is missing (or impacted in a way that would make the C-band unusable), as indicated in the decision diamond 104. If the C-band is not missing (i.e., the C-band is present), then the method 100 proceeds to decision diamond 106. Otherwise, if the C-band is missing or impacted, the method 100 proceeds to decision diamond 110.

The method 100 includes the step of determining, as indicated in decision diamond 106, if the L-band is missing (or impacted in a way that would make the L-band unusable). If the L-band is not missing (i.e., the L-band is present), then it is known that both the C-band and L-band are present and there are no issues (e.g., faults) with transmitting the optical signals. The method 100 includes, at this point, the step of determining if a baseline profile has been saved, as indicated in decision diamond 108. In other words, if both the C-band and L-band are both present, then a baseline profile may be obtained. The baseline profile is used to represent what the spectrum may look like when the C+L band photonic line system is operating according to design and there are no faults in the system. If it is determined in decision diamond 108 that a baseline profile has not yet been saved, then the monitored spectrum of the C-band and L-band signals can be saved as the baseline transmission profile, as indicated in block 114. Otherwise, if a baseline profile has already been saved, the method 100 can loop back to block 102 to continue monitoring the spectrum.

If, in response to a determination in decision diamond 106 that the L-band is missing, then it will be known at this point that the C-band is present, but the L-band is missing and the method 100 proceeds to block 112. It is indicated in block 112 that the method 100 includes the step of designating the C-band as the "surviving" band.

As mentioned above, if the C-band is found to be missing, as determined in decision diamond 104, then the method 100 proceeds to decision diamond 110. In decision diamond 110, it is determined whether or not the L-band is missing. If the L-band is missing, then it will be known at this point that both the C-band and L-band signals are missing and the method 100 jumps ahead to block 126, which includes the step of reporting that there is a failure in both bands and the method comes to an end. If both bands are missing or absence, then there are no surviving bands and solutions will be needed to fix this issue. However, fixing the condition of both bands being missing may normally go beyond the scope of the present disclosure, although it will be appreciated that various steps may be taken in this regard.

If it is determined in decision diamond 110 that the L-band is not missing, then the method proceeds to block 116. At this point, it will be known that the C-band is missing, but the L-band is present. According to block 116, the method 100 includes the step of designating the L-band as the "surviving" band. After one of the bands is designated as the surviving band (according to blocks 112 or 116), the method proceeds to block 118.

As indicated in block 118, the method 100 includes the step of measuring the transmission profile of the surviving band (either the C-band or L-band) on the preceding fiber span. The method 100 calculates a difference between the measured transmission profile and a saved baseline profile (e.g., the baseline transmission profile saved with respect to block 114). This difference represents how the surviving band is influenced when the other band is missing. As described in the present disclosure, the surviving band will provide a changed power spectrum density when there is an issue in the C+L band photonic line system that would cause the other band to go missing.

In response to calculating the difference in the waveform of the power spectrum density with respect to what the waveform would normally look like (i.e., in response to block 120), the method 100 includes the step of calculating a gain correlation profile from the calculated difference, as indicated in block 122. The method 100 also includes the step of applying the gain correction profile to a corresponding optical amplifier to compensate for the change in the power spectrum density of the surviving band, as indicated in block 124. This compensation is configured to get the power spectrum density of the transmission profile waveform of the surviving band back to where it should be. At this time, the method 100, in this embodiment, may come to an end.

Figure 9:
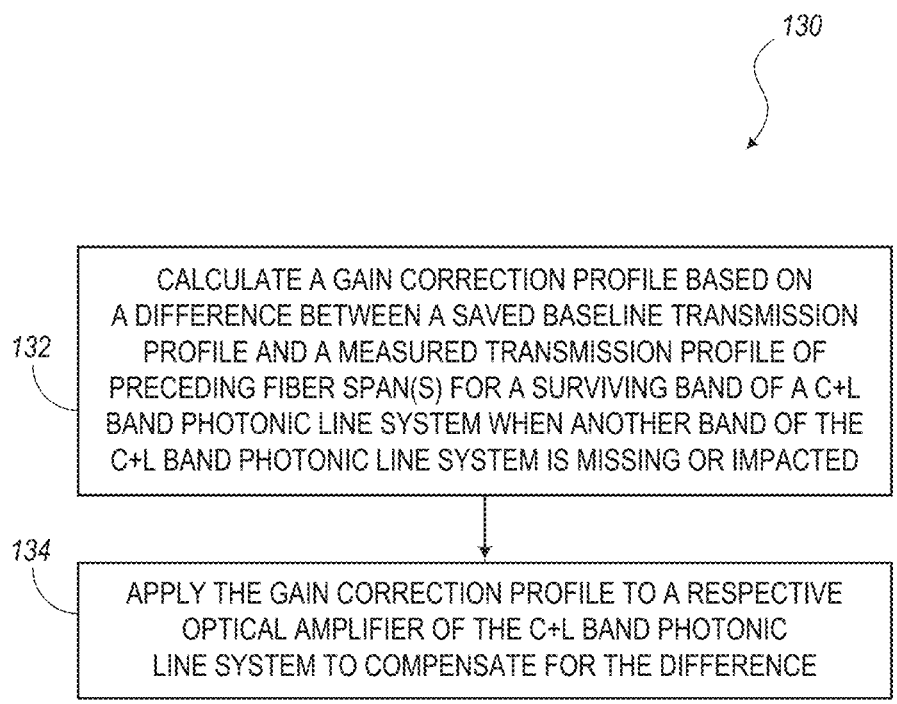
FIG. 9 is a flow diagram illustrating a general method for compensating for a difference between a baseline transmission profile and a measured transmission profile when a fault is present in a photonic line system to provide recovery of a surviving band, according to various embodiments of the present disclosure.

FIG. 9 is a flow diagram of a general method 130 for managing C+L traffic. The method 130 in this embodiment includes the step of calculating a gain correction profile based on a difference between a saved baseline transmission profile and a measured transmission profile on one or more preceding fiber spans for a surviving band of a C+L band photonic line system when another band of the C+L band photonic line system is missing or impacted, as indicated in block 132. The method 130 also includes the step of applying the gain correction profile to a respective optical amplifier of the C+L band photonic line system to compensate for the difference, as indicated in block 134.

Those skilled in the pertinent art will appreciate that various embodiments may be described in terms of logical blocks, modules, circuits, algorithms, steps, and sequences of actions, which may be performed or otherwise controlled with a general purpose processor, a DSP, an application specific integrated circuit (ASIC), a field programmable gate array, programmable logic devices, discrete gates, transistor logic, discrete hardware components, elements associated with a computing device, or any suitable combination thereof designed to perform or otherwise control the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, those skilled in the pertinent art will appreciate that the various illustrative logical blocks, modules, circuits, algorithms, and steps described in connection with the embodiments described in the present disclosure may be implemented as electronic hardware, computer software, or any suitable combinations thereof. To clearly illustrate this interchangeability of hardware and software, various illustrative components, blocks, modules, circuits, algorithms, and steps have been described herein in terms of their general functionality. Whether such functionality is implemented in hardware or software depends upon the particular application and design constraints, and those skilled in the pertinent art may implement the described functionality in various ways to suit each particular application, but such implementation decisions should not be interpreted as causing a departure from the scope or spirit of the present disclosure. Additionally, the various logical blocks, modules, circuits, algorithms, steps, and sequences of actions described herein can be considered to be embodied entirely within any form of computer readable storage medium having stored therein a corresponding set of computer instructions that upon execution would cause an associated processor to perform the functionality described herein. Thus, the various aspects and embodiments disclosed herein may be embodied in a number of different forms, all of which have been contemplated to be within the scope or spirit of the claimed subject matter. In addition, for each of the embodiments described herein, the corresponding form of any such embodiments may be described herein as, for example, "logic configured to" perform the described action.

The methods, sequences and/or algorithms described in connection with the embodiments disclosed herein may be embodied directly in hardware, in a software module executed by a processor, or any suitable combination thereof. Software modules may reside in memory controllers, DDR memory, RAM, flash memory, ROM, electrically programmable ROM memory (EPROM), electrically erase programmable ROM (EEPROM), registers, hard disks, removable disks, CD-ROMs, or any other storage medium known in the art or storage medium that may be developed in the future. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal or other computing device. In the alternative, the processor and the storage medium may reside as discrete components in a user terminal or other computing device.

In one or more exemplary embodiments, the control functions described may be implemented in hardware, software, firmware, or any combination thereof. If implemented in software, the functions may be stored on or transmitted over as one or more instructions or code on a computer-readable medium. Computer-readable media includes both storage media and communication media, including any medium that facilitates transferring a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage, or other magnetic storage devices or media that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The following description includes explanations of various graphs of measurements of transmission profiles, based on the Power Spectrum Density (PSD) measured in decibel milliwatts (dBm) (shown on the y-axis) with respect to frequency (shown on the x-axis). The PSD is measured over the spectrum of frequencies (i.e., a range from about 191.7 THz to about 196.1 THz) in the infrared C-band (i.e., signals with a wavelength between 1530 nm and 1565 nm), assuming that the signals are transmitted in a vacuum. The PSD is also measured over the spectrum of frequencies (i.e., a range from about 184.6 THz to about 191.7 THz) in the infrared L-band (i.e., signals with a wavelength between 1565 nm and 1625 nm), assuming that the signals are transmitted in a vacuum. However, the optical fibers may have a refractive index of about 1.5, which will alter the ranges.

The controller 10 described with respect to FIG. 1 may be configured to apply the changes without any coordination with upstream or downstream controllers and hence, eliminates dependency on e2e east-west communications. To ensure the transmission profile is not evolving due to upstream changes, the control device 10 takes a plurality of measurements to ensure a steady transmission profile before applying the changes to the downstream amplifiers. It may also be noted that the control device 10 may still rely on getting spectrum profile information from the immediate upstream node for the preceding fiber span, whereby only peer-to-peer communications dependency exists with the immediate upstream peer. Failure of one controller not getting the information does not impact any downstream controllers. Thus, control can be handled individually at each optical amplifier to compensate for influences of a missing band.

When a particular band (either the C-band or the L-band) power disappears from the input or output of its respective amplifier or spectrum monitoring device (e.g., Optical Channel Monitor (OCM)), an event notification may be generated that can be used as a trigger for the control device 10 to apply the corrections. The control device 10 may be configured to set a status flag on the node level following a link calibration process to ensure that the control device 10 can trigger the spectrum/band monitoring. The flag can also be used for any future installation or maintenance operations. In case of a fiber cut or optical line failure, where both bands disappear, the control device 10 may not necessarily provide additional gain profile compensation.

In case the amplifier 46 is not equipped with optical spectrum monitoring capabilities at its input (e.g., AMP 1 labelled 46-1 in FIG. 2), the control device 10 may be configured to measure the spectrum power profile (and tilt) from the output and applies an amplifier gain modelling (including gain-tilt and ripple) based on factory-calibrated calibration data points (if available specific to the amplifier circuit pack) to estimate a spectrum profile at its input and use that for transmission profile estimation for the preceding fiber span. The same kind of modelling may be applied if optical spectrum monitoring is available only at an amplifier input (e.g., AMP6 labelled as 46-6 in FIG. 2), but not at its output to estimate the launch profile spectrum. If factory-calibrated data points are not available, the control device 10 can also use typical gain transfer function for backward scaling.

The control device 10 may be configured to run at each of the amplifier locations associated with each of the amplifiers (e.g., amplifiers 46-1, 46-2, 46-3, 46-4, 46-5, 46-6), including the intermediate line amplifier sites and at Reconfigurable Optical Add Drop Multiplexer (ROADM) pre-amp and post-amp locations, where there are per-band spectrum profile monitoring capabilities at its input and/or output. The transmission profiles per span can be calculated and saved as baseline profiles. Comparison of the transmission profiles with actual measurements can be made to establish gain corrections, which can then be applied by an external controller, such as a Software-Defined Networking (SDN) device.

Figure 10A:
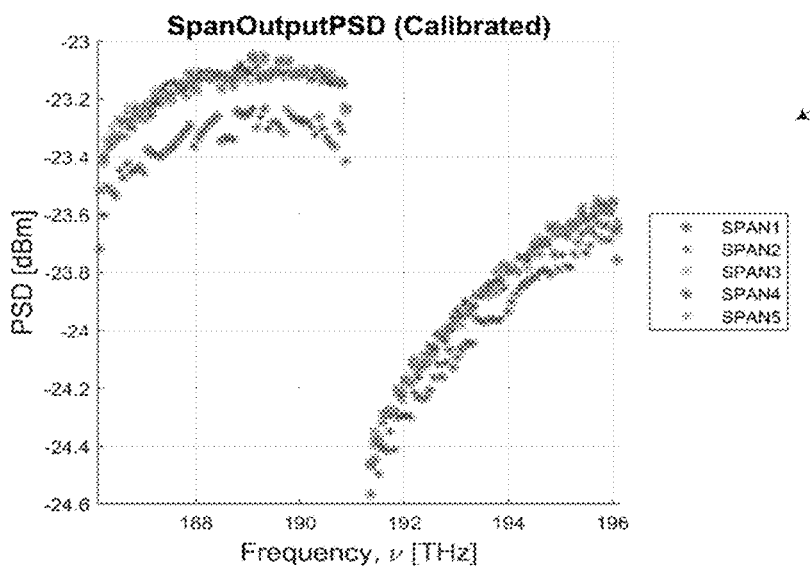
FIGS. 10a-10c are graphs illustrating how a calibrated or baseline span loss profile is calculated, according to various embodiments.
Figure 10B:
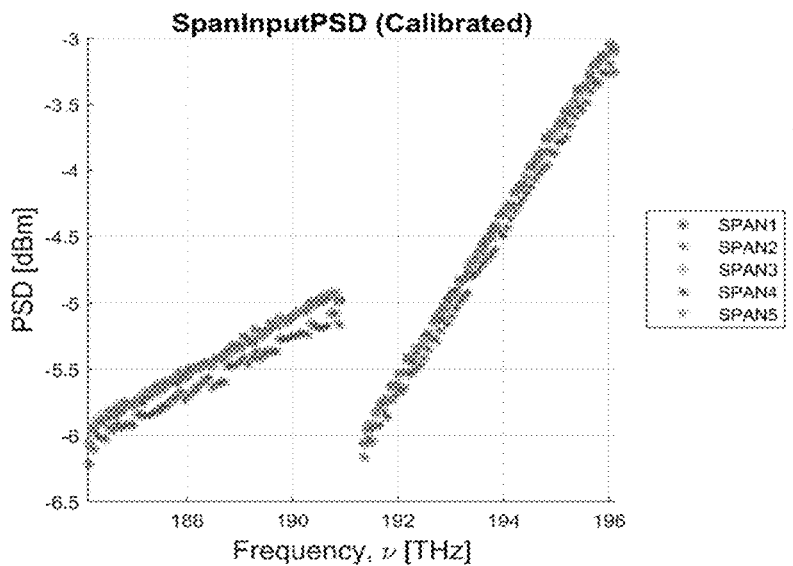
Figure 10C:
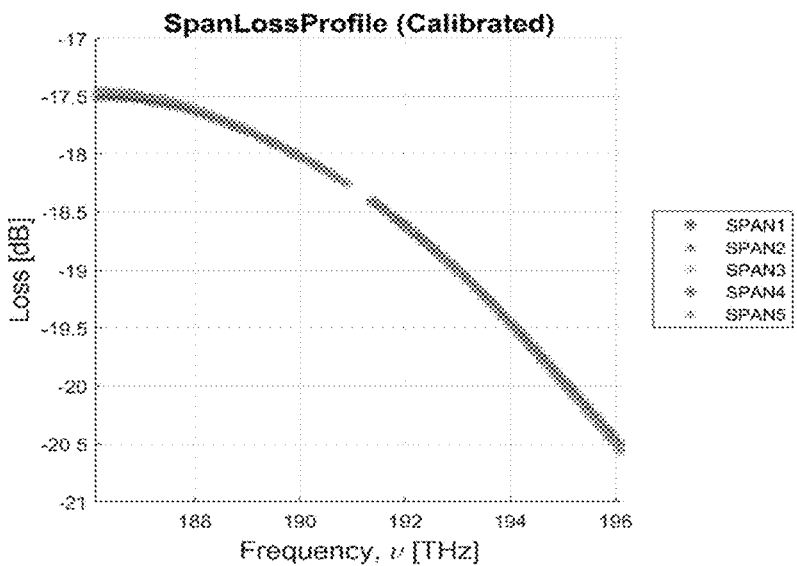

The following defines the calculations of the control device 10 to determine various transmission profiles:

PSDProfile$_{fibIn|C\ or\ L}$=Launch Power Profile for C—or L–band to preceding fiber span PSDProfile$_{fibOut|C\ or\ L}$=Received Power Profile for C—or L–band at the output of the preceding fiber span TransmissionProfile$_{fib|C\ or\ L}$=PSDProfile$_{fibIn|C\ or\ L}$-PSDProfile$_{fibOut|C\ or\ L}$ BaseTransmissionProfile$_{fib|C\ or\ L}$=Baseline saved following link calibration with desired spectral loading MeasTransmissionProfile$_{fib|C\ or\ L}$=Measured profile for C—or L–band following the disappearance of the other band transmission Error$_{fib|C\ or\ L}$=MeasTransmissionProfile$_{fib|C\ or\ L}$-BaseTransmissionProfile$_{fib|C\ or\ L}$ A linear fit on the transmissionError$_{fib|C\ or\ L}$ reveals the necessary target gain and gaintilt corrections need to be made TargetGainProfile$_{EDFA|C\ or\ L}$=CurrentGainProfile$_{EDFA|C\ or\ L}$+transmissionError$_{fib|C\ or\ L}$ Once the new target gain profile is available for the respective amplifier, target gain can be applied and the tilt changes can be provided accordingly. For example, the control device 10 may apply a "smoothing function" over a "new target gain profile." The control device 10 may apply a linear fit over the smoothing function profile. A target gain may be set equal to a mean of a linear fit. The target gain tilt may be equal to a slope of the linear fit. These parameters may be limited in some cases by specific allowable ranges. If the amplifier contains a mid-stage Dynamic Gain-Flattening Filter (DGFF) component for dynamic ripple adjustment and gain-flattening, then the control device 10 may be configured to
 a. Generate gain-error profile=$e_i(t)=-1*(y_i-\hat{y}_i)$; where, $y_i$=smoothen target gain profile; $\hat{y}_i$=linear fitted profile;
 b. apply deadzone on error if necessary, before making attenuation adjustment
 c. Estimate new midstage attenuation, $A_{est,i}(t)=A_i(t-1)+(e_i(t)-Min(e_{ALL}(t)))$;
 d. Push min attenuation to zero; New Target Attenuation=$A_i(t)=A_{est,i}(t)-Min(A_{est,ALL}(t))$;
 e. If $A_i(t)$>MaxAttenuation, clamp $A_i(t)$=MaxAttenuation;

FIGS. 10a-10c are graphs 140, 142, 144 illustrating an analysis of the five optical fiber spans 52-1, 52-2, 52-3, 52-4, 52-5 of the photonic line system 30 when the photonic line system 30 is operating properly. The graph 140 of FIG. 10a shows the levels of PSD measured at the output of each of the fiber spans 52. The graph 142 of FIG. 10b shows the levels of the PSD measured at the input of each of the fiber spans 52. These measurements represent "calibrated" or "baseline" levels representing what signals may be expected on the photonic line system 30 when the photonic line system 30 is operating properly (without faults). The graph 144 of FIG. 10c is calculated by subtracting the Span Input (FIG. 10b) from the Span Output (FIG. 10a) and represents a Span Loss of each of the spans 52 when the photonic line system 30 is operating properly.

Figure 11A:
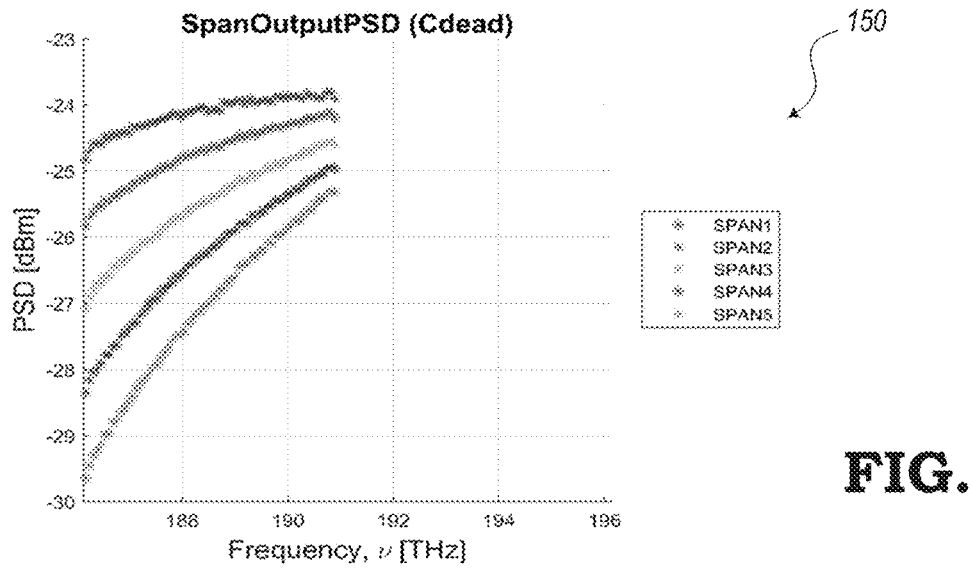
FIGS. 11a-11c are graphs illustrating how a span loss profile for the L-band is measured when the C-band is missing, according to various embodiments.
Figure 11B:
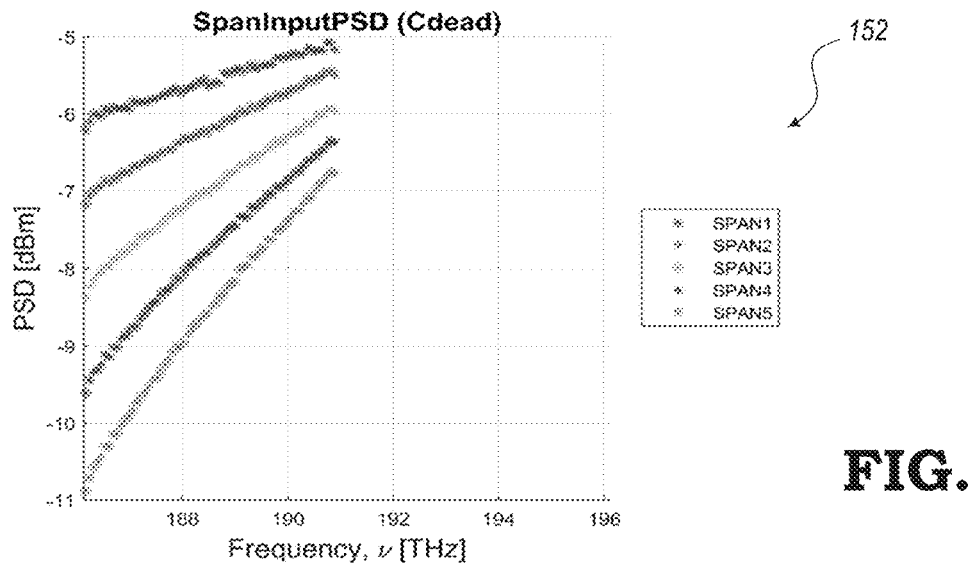
Figure 11C:
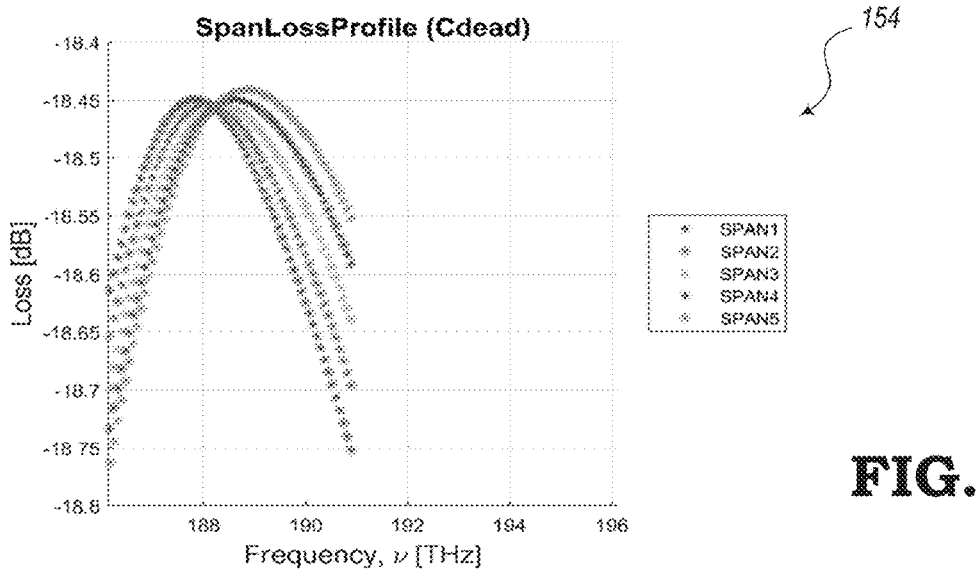

FIGS. 11a-11c are graphs 150, 152, 154 showing L-band signals over each of the fiber spans 52 when there is a fault that causes the C-band to go missing. FIG. 11a shows the span output and FIG. 11b shows the span input. It may be noted that the measured PSD differs from the calibrated or baseline levels for the L-band shown in FIGS. 10a and 10b. The Span Loss profile of the L-band (when the C-band is absent or "dead") is shown in the graph 154 of FIG. 11c. The Span Loss of the graph 154 is calculated as the difference between the output (FIG. 11a) and the input (FIG. 11b).

Figure 12A:
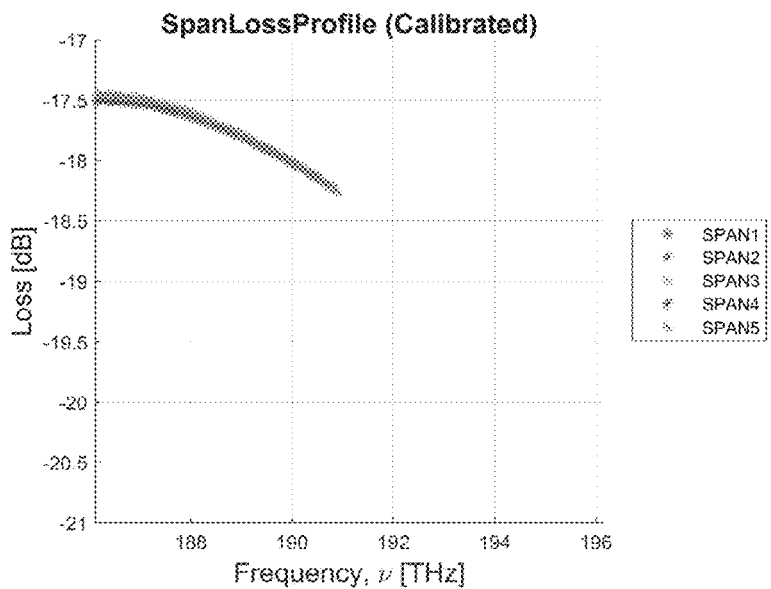
FIG. 12a-12c are graphs illustrating how a target gain correction profile is calculated from the span loss profile of FIG. 11 when the C-band is missing, according to various embodiments of the present disclosure.
Figure 12B:
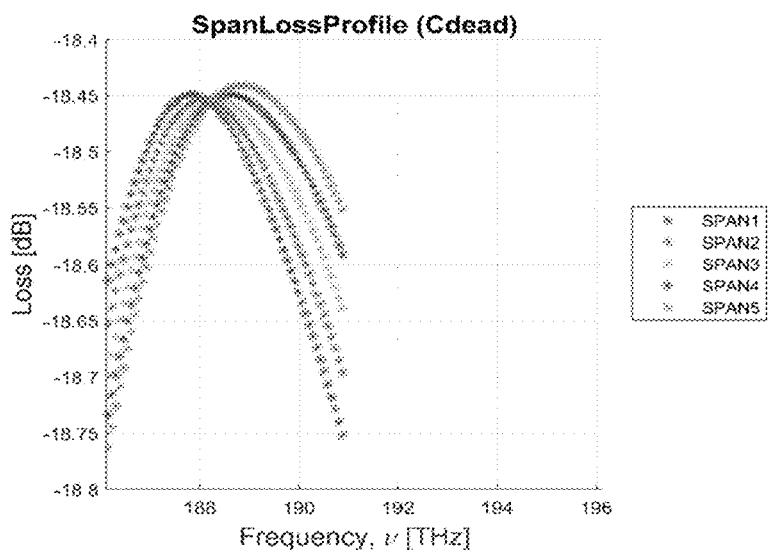
Figure 12C:
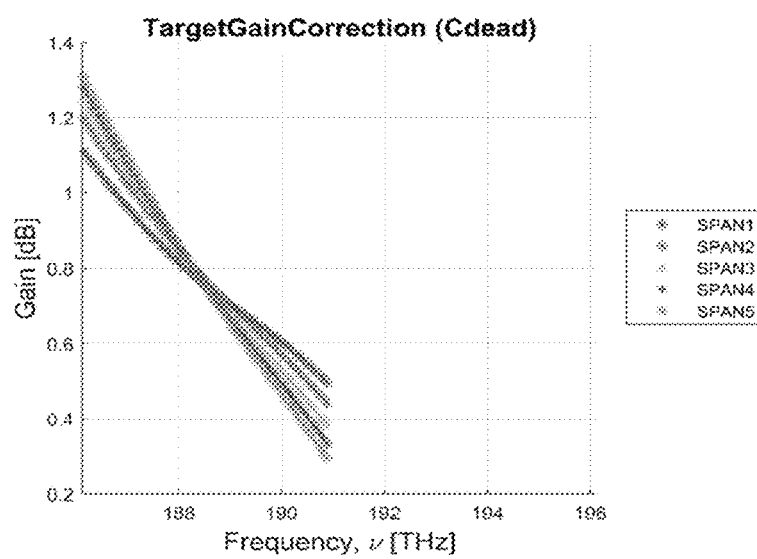

FIGS. 12a-12c are graphs 160, 162, 164 showing the L-band signals over each of the fiber spans 52 when the C-band is missing (or absent or dead). The graph 160 of FIG. 12a shows a portion (e.g., the L-band portion) of the calibrated or baseline profile shown in the graph 144 of FIG. 10c representing what the L-band should look like when the photonic line system is operating properly. However, when the C-band is missing, the Span Loss of the L-band is calculated (i.e., as also shown in FIG. 11c). Thus, the actual measurements of the loss profile (FIG. 12b) can be compared with the baseline (e.g., ideal) loss profile (FIG. 12a). In order to compensate the L-band for this difference, the gain correction micro-service 28 of FIG. 1B may be used to determine what type of amplification correction may be needed at one or more of the respective amplifiers 46 to get the L-band back to (or close to) the baseline levels. This compensation can be calculated by determining the difference between the loss profile of graph 160 and the loss profile of graph 162. Thus, the graph 164 shows a target gain correction profile for correcting the gain as needed to attempt to emulate the calibrated loss profile of the graph 160 of FIG. 12a. The gain correction of FIG. 12c may be applied to one or more of the optical amplifiers 46 to get back to the baseline levels.

FIGS. 13a-13c and FIGS. 14a-14c illustrate the situation where the L-band is missing or absent. Thus, FIGS. 13 and 14 include techniques for compensating for the C-band (when the L-band is missing), which are similar to the techniques described above with respect to FIGS. 11 and 12 regarding the situation where the C-band is missing or absent.

Figure 13A:
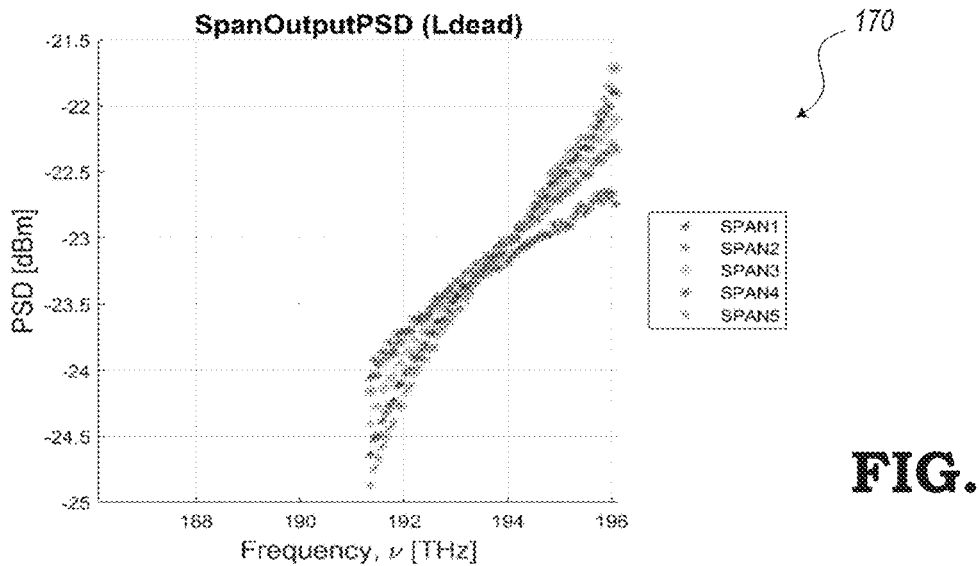
FIGS. 13a-13c are graphs illustrating how a span loss profile for the C-band is measured when the L-band is missing, according to various embodiments.
Figure 13B:
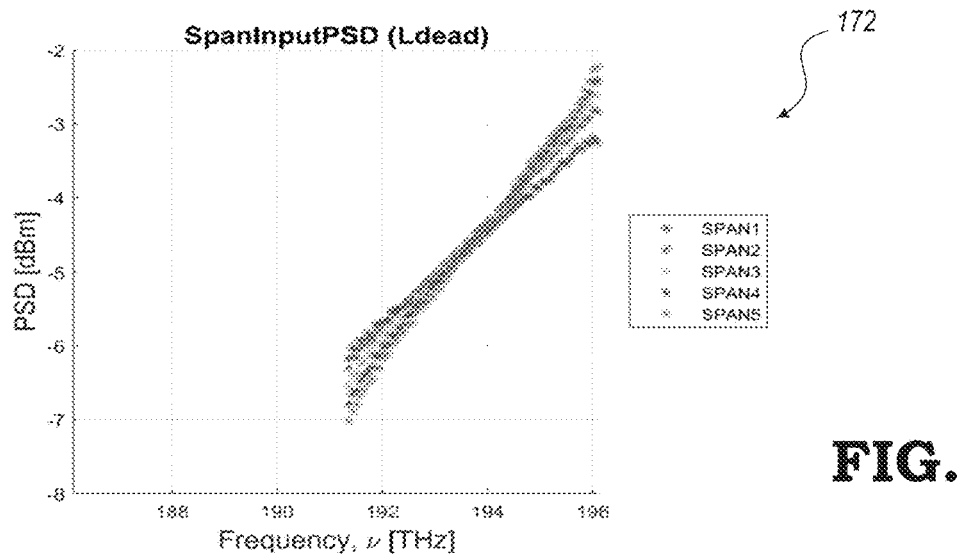
Figure 13C:
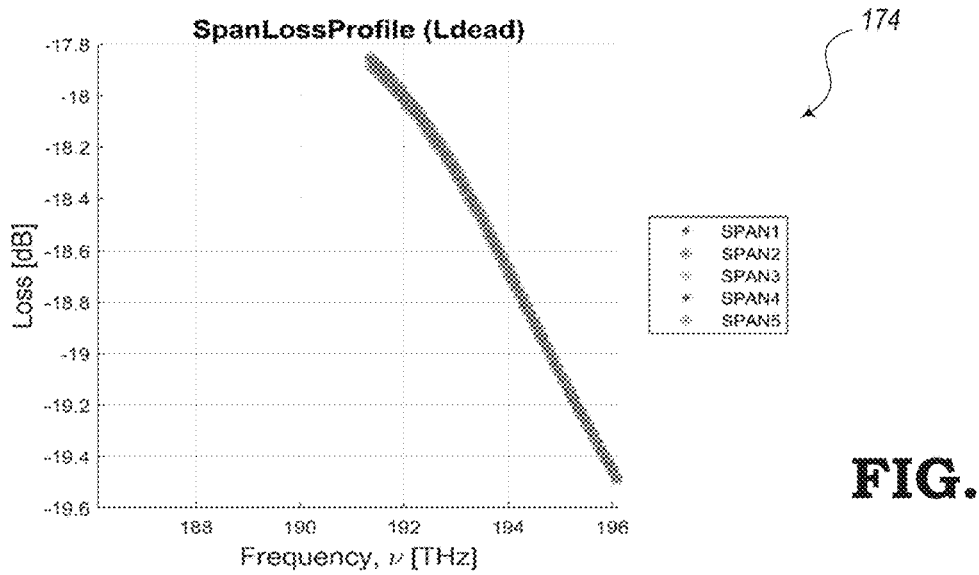

FIGS. 13a-13c are graphs 170, 172, 174 showing C-band signals over each of the fiber spans 52 when there is a fault that causes the L-band to go missing. FIG. 13a shows the span output and FIG. 13b shows the span input. It may be noted that the measured PSD differs from the calibrated or baseline levels for the C-band shown in FIGS. 10a and 10b. The Span Loss profile of the C-band (when the L-band is absent or "dead") is shown in the graph 174 of FIG. 13c. The Span Loss of the graph 174 is calculated as the difference between the output (FIG. 13a) and the input (FIG. 13b).

Figure 14A:
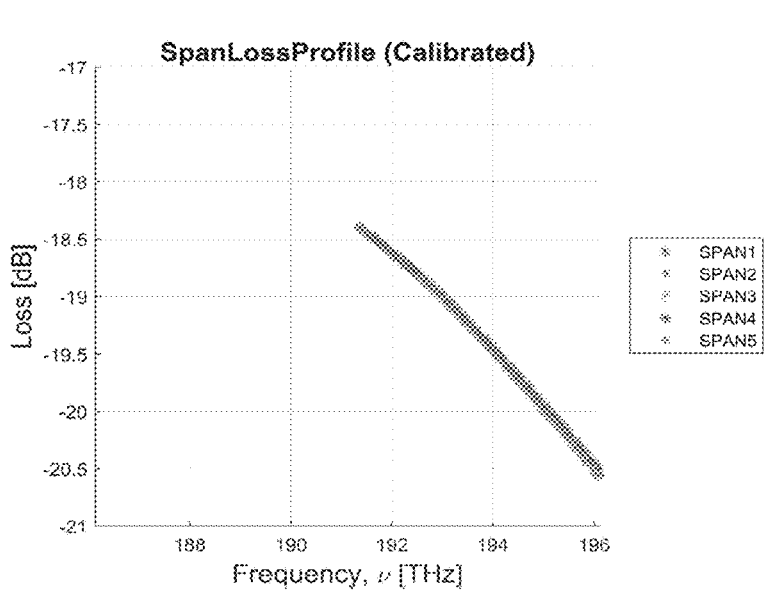
FIG. 14a-14c are graphs illustrating how a target gain correction profile is calculated from the span loss profile of FIG. 11 when the L-band is missing, according to various embodiments of the present disclosure.
Figure 14B:
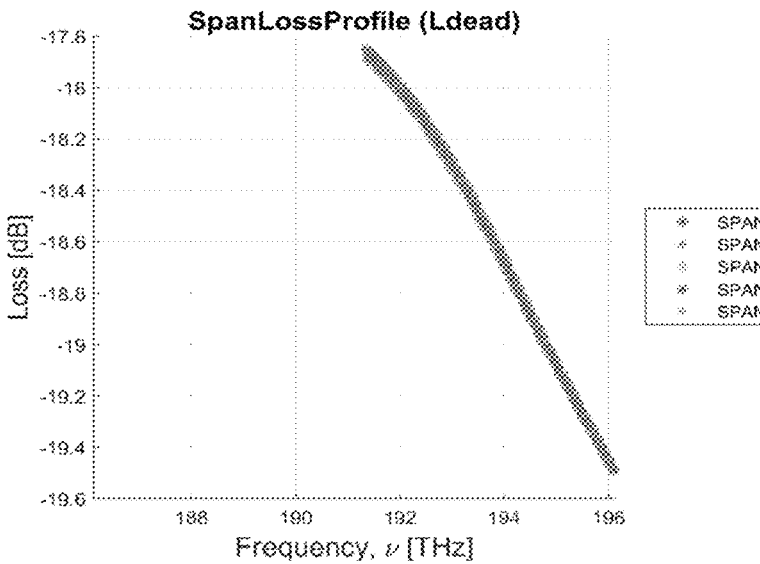
Figure 14C:
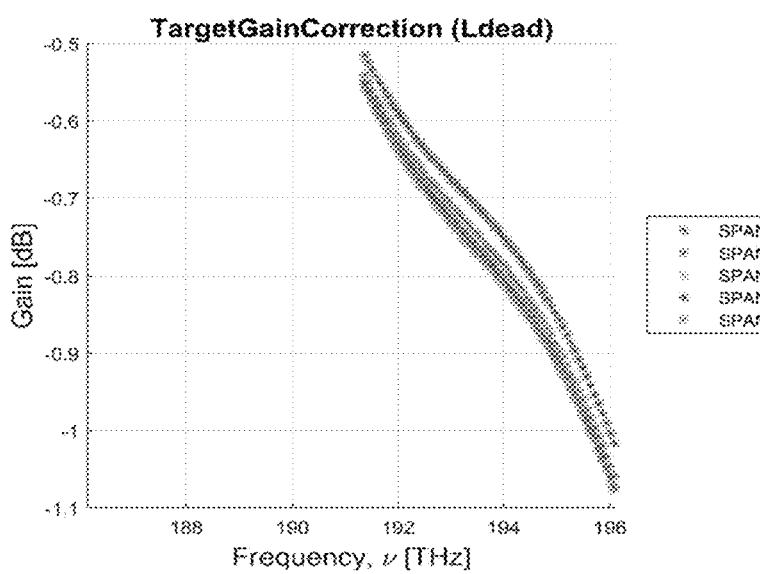

FIGS. 14a-14c are graphs 180, 182, 184 showing the C-band signals over each of the fiber spans 52 when the L-band is missing (or absent or dead). The graph 180 of FIG. 14a shows a portion (e.g., the C-band portion) of the calibrated or baseline profile shown in the graph 144 of FIG. 10c representing what the C-band should look like when the photonic line system is operating properly. However, when the L-band is missing, the Span Loss of the C-band is calculated (i.e., as also shown in FIG. 13c). Thus, the actual measurements of the loss profile (FIG. 14b) can be compared with the baseline (e.g., ideal) loss profile (FIG. 14a). In order to compensate the C-band for this difference, the gain correction micro-service 28 of FIG. 1B may be used to determine what type of amplification correction may be needed at one or more of the respective amplifiers 46 to get the C-band back to (or close to) the baseline levels. This compensation can be calculated by determining the difference between the loss profile of graph 180 and the loss profile of graph 182. Thus, the graph 184 shows a target gain correction profile for correcting the gain as needed to attempt to emulate the calibrated loss profile of the graph 180 of FIG. 14a. The gain correction of FIG. 14c may be applied to one or more of the optical amplifiers 46 to get back to the baseline levels.

Figure 15A:
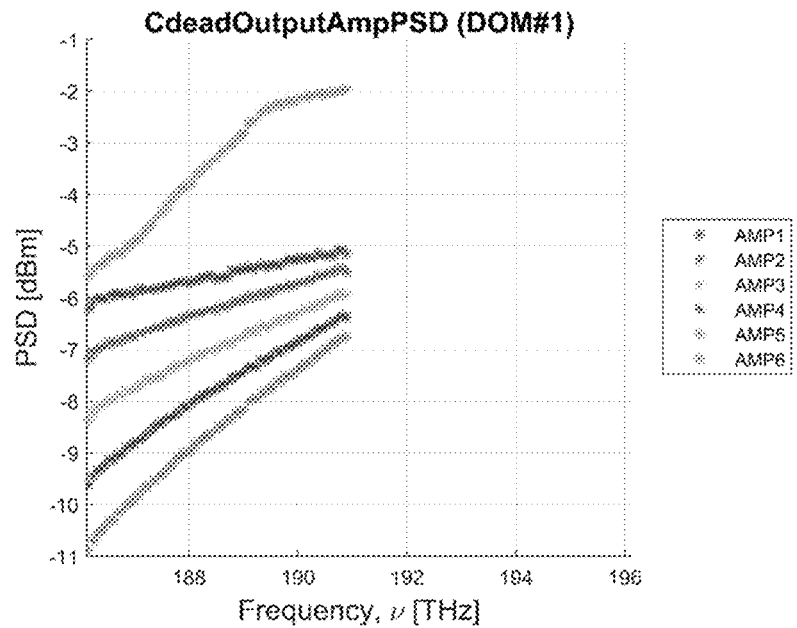
FIGS. 15a-15d are graphs illustrating measurements at the output of the amplifiers when the C-band is missing and calculations of SNR, according to various embodiments.
Figure 15B:
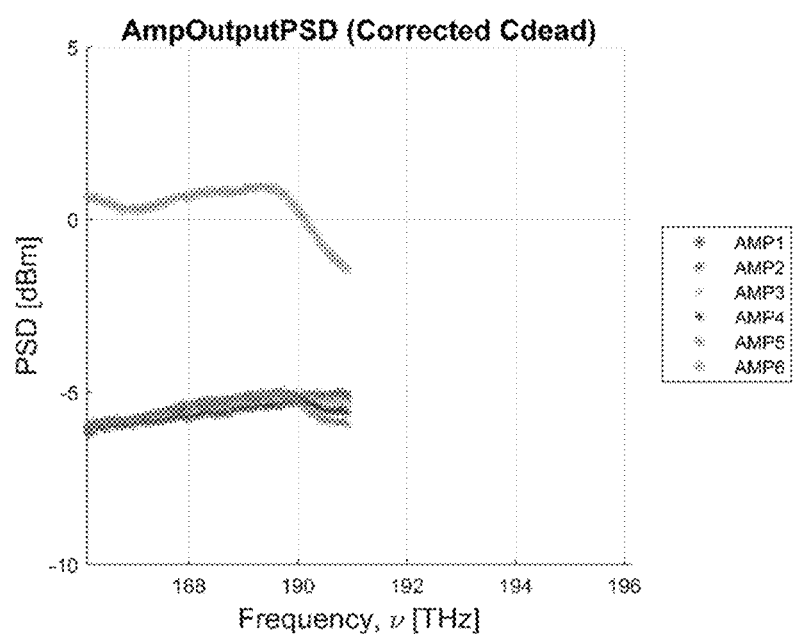

FIGS. 15a-15d are graphs 190, 192, 194, 196 illustrating measurements made at the inputs and outputs of each of the C-band and L-band amplifying portions 48, 50 of the amplifiers 46 (e.g., measured by the OCM components). FIG. 15a shows the graph 190 of the output of the amplifiers 46-1, 46-2, . . . , 46-6 of the measured PSD when the C-band is dead. (This graph 190 is the same as the graph 62 of FIG. 4b.) The graph 192 of FIG. 15b shows the output of the amplifiers 46-1, 46-2, . . . , 46-6 of the measured PSD, in one implementation, when the gain correction has been applied to one or more amplifiers 46 to compensate for the negative influences caused by the C-band being missing. In particular, the gain correction shown in the graph 164 of FIG. 12c may be used, as described above, to attempt to get the profile back to (or close to) the baseline of L-band shown in the graph 144 of FIG. 10c. It should be noted that the gain correction (resulting in the graph 192 of FIG. 15b) successfully changes the L-band profile to closely match the baseline levels (FIG. 4b) and is much more accurate than the measured L-band profile before gain correction is applied (i.e., graph 62 of FIG. 4b).

Figure 15C:
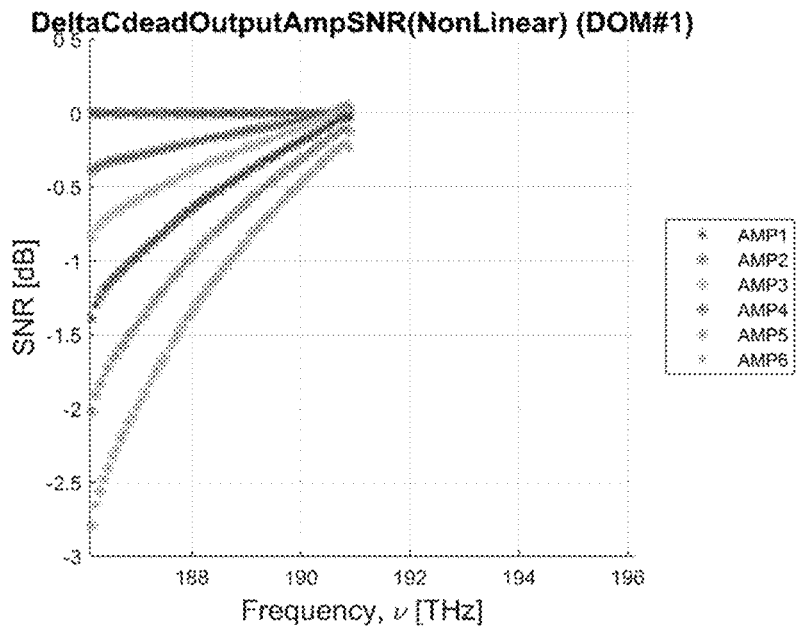
Figure 15D:
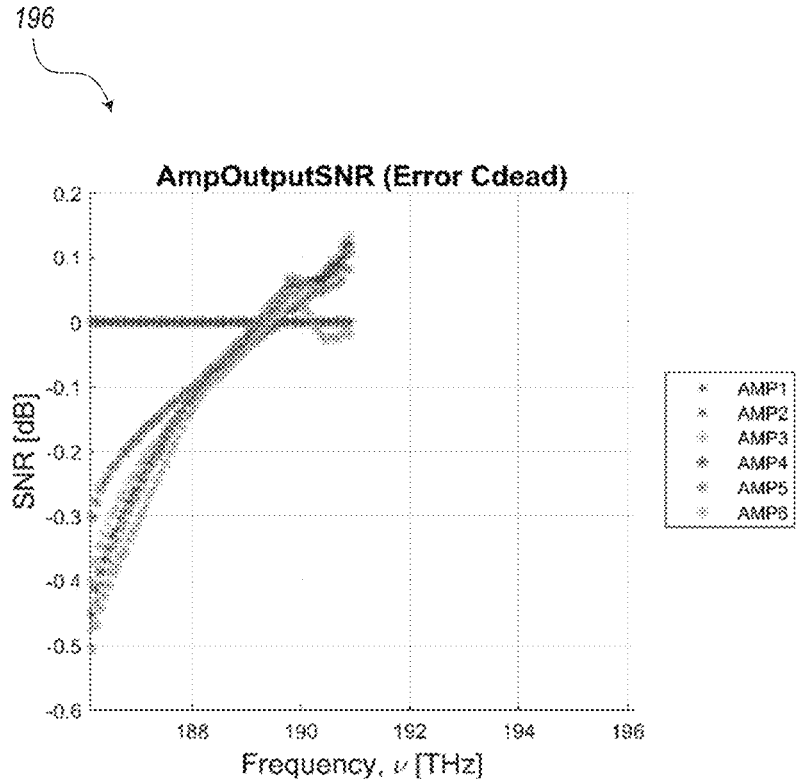

The graph 194 of FIG. 15c shows the change (delta) in the SNR of the output of the amplifiers 46 when the C-band is dead, whereby the graph 194 shows the situation (similar to FIG. 4d) of the C-band being absent and before gain correction is applied. The graph 196 of FIG. 15d shows the delta in the SNR of the output of the amplifiers 46 when the C-band is dead, whereby the graph 194 shows the situation after the gain correction is applied. According to the various embodiments of the present disclosure, when the C-band is dead, an input (launch) power penalty is reduced from about 6 dB to about 0.4 dB, and SNR penalty is reduced from 2.8 dB to 0.4 dB for L band channels.

Figure 16A:
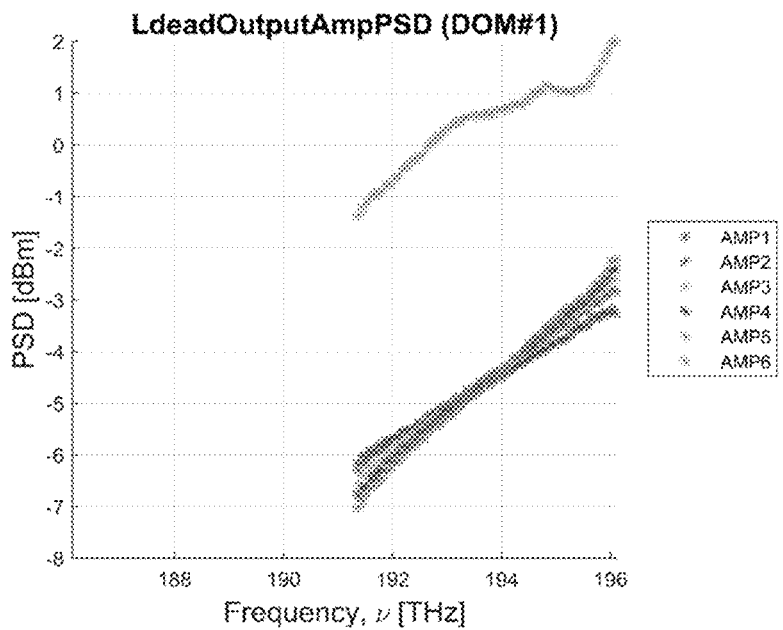
FIGS. 16a-16d are graphs illustrating measurements at the output of the amplifiers when the L-band is missing and calculations of SNR, according to various embodiments.
Figure 16B:
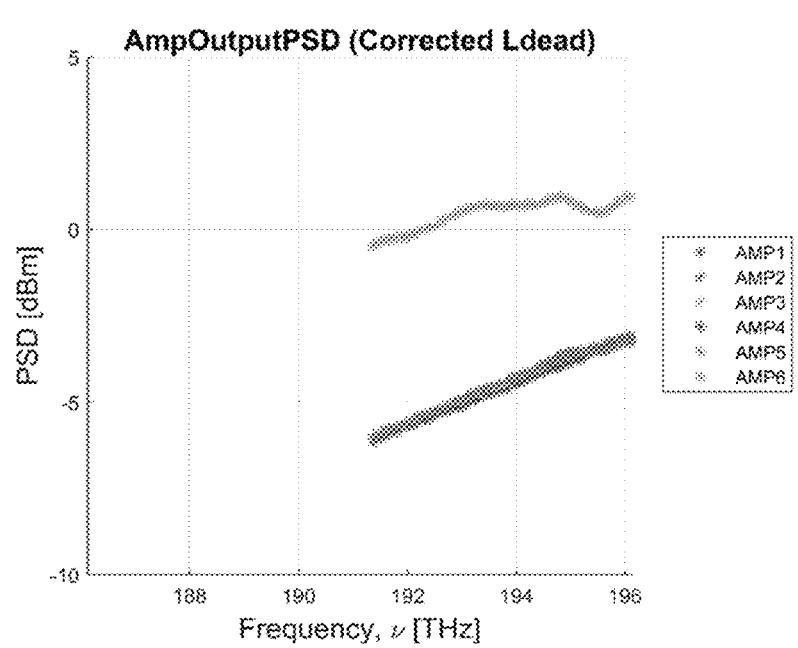

FIGS. 16a-16d illustrate measurements and calculation similar to FIGS. 15a-15d. However, FIG. 16 illustrates the situation where the L-band is missing, whereby FIG. 15 illustrates the situation where the C-band is missing. FIGS. 16a-16d are graphs 200, 202, 204, 206 illustrating measurements made at the inputs and outputs of each of the C-band and L-band amplifying portions 48, 50 of the amplifiers 46 (e.g., measured by the OCM components). FIG. 16a shows the graph 200 of the output of the amplifiers 46-1, 46-2, . . . , 46-6 of the measured PSD when the L-band is dead. (This graph 200 is the same as the graph 72 of FIG. 5b.) The graph 202 of FIG. 16b shows the output of the amplifiers 46-1, 46-2, . . . , 46-6 of the measured PSD, in one implementation, when the gain correction has been applied to one or more amplifiers 46 to compensate for the negative influences caused by the L-band being missing. In particular, the gain correction shown in the graph 184 of FIG. 14c may be used, as described above, to attempt to get the profile back to (or close to) the baseline of C-band shown in the graph 144 of FIG. 10c. It should be noted that the gain correction (resulting in the graph 202 of FIG. 16b) successfully changes the C-band profile to closely match the baseline levels (FIG. 5b) and is much more accurate than the measured C-band profile before gain correction is applied (i.e., graph 72 of FIG. 5b).

Figure 16C:
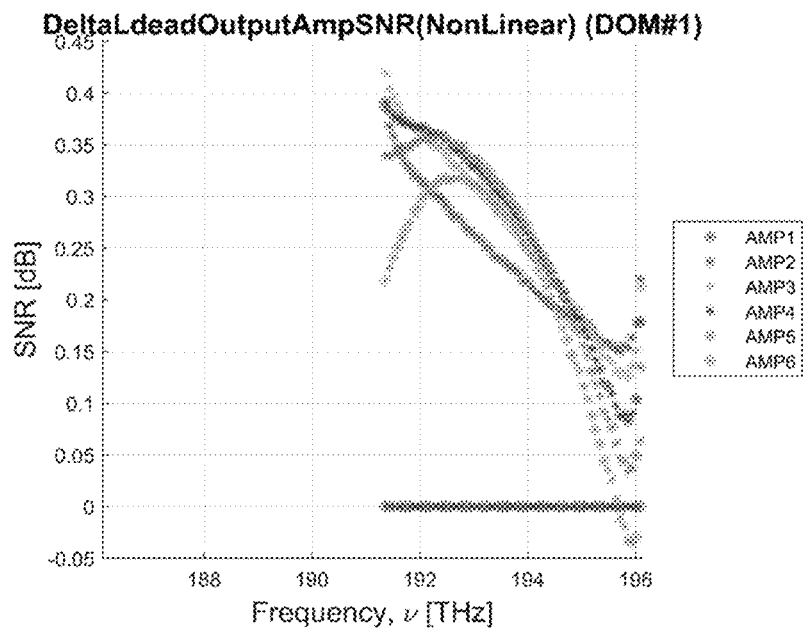
Figure 16D:
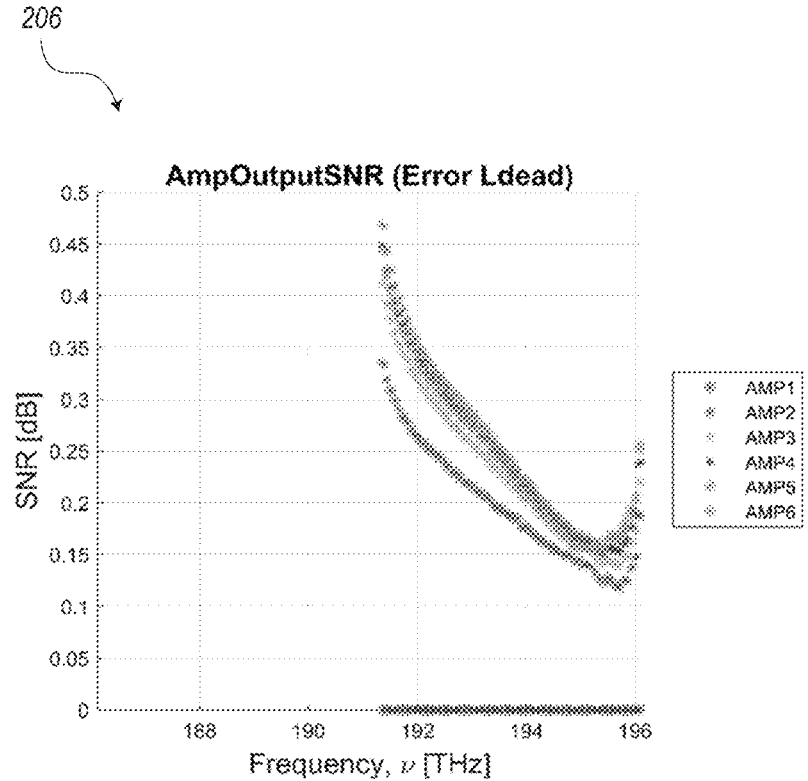

The graph 204 of FIG. 16c shows the change (delta) in the SNR of the output of the amplifiers 46 when the L-band is dead, whereby the graph 204 shows the situation (similar to FIG. 5d) of the L-band being absent and before gain correction is applied. The graph 206 of FIG. 16d shows the delta in the SNR of the output of the amplifiers 46 when the L-band is dead, whereby the graph 204 shows the situation after the gain correction is applied. According to the various embodiments of the present disclosure, when the L-band is dead, an input (launch) power penalty is reduced from about 1.2 dB to about 0.25 dB.

Therefore, the systems and methods of the present disclosure includes several aspects that are non-conventional with respect to known systems. One point of novelty of the present disclosure includes handling band-amplifiers and/or spectrum failures in a C+L system using local adjustment on the surviving band amplifiers that can run in parallel and asynchronously without any control dependency with each other or without any sequencing activity from an external controller, such as SDN.

Also, the systems and methods of the present disclosure include the feature of saving the transmission profile or per span transfer function at system calibration for a given spectral loading condition, which is not typically performed in conventional systems. The present disclosure understands that, in a C+L system, a band failure primarily translates to an SRS shift coming from the fiber transmission system, and thus the present systems are configured to use that reference transmission profile to track down target gain profile changes for the amplifiers in the surviving band.

The present disclosure may also include additional points of novelty that do not exist in conventional systems. For example, another point of novelty may include the focus on gain/loss profile changes per span, instead of focusing on power adjustments. This allows the local controllers to run independent of each other with minimal east-west communications dependency.

In an optical section of a C+L system with multiple fiber spans, the present disclosure includes non-conventional local controllers (e.g., control device 10) that are configured to react to upstream changes based on information flow from upstream. The local controllers may run independently. This may be detected by removing any in-band or out-of-band communication between two intermediate ILA nodes in a fiber span. In a test to detect the local controllers of the present disclosure, it may be possible to stop transmission for a C-band from an amplifier (e.g., put the amplifier in shutdown condition, put it out-of-service, disconnect fiber from C-band amplifier to a common output, etc.), and then determine if the fiber is accessible. This may cost a drop-in power and tilt over the spectrum for the surviving L-band. This may also ensure the stop transmission takes place upstream of the span where the communication was blocked.

Also, if amplifiers downstream to the span where the communication was blocked still manage to apply a correction to its gain profile (i.e., automatically re-aligns its launch power profile output to its target launch profile), then such a test will indicate that the gain correction micro-service 28 of the present disclosure is operating properly. The amplifier located immediate downstream to the span where the communication is blocked may not make an update on its gain profile for the amplifier since it may not receive transmission profile information from immediate upstream amplifier. However, with the systems and methods of the present disclosure, all other amplifiers in further downstream fiber spans with no intermediate communication error may still succeed on receiving transmission profile from upstream and also apply necessary gain profile changes, as needed, to respective amplifiers for the surviving band.

In some cases, an amplifier may have no spectrum monitoring capability at its input and may only have tilt monitoring capability at its output (e.g., RLS Dual-Line Amplifier (DLA)). In this case, a linear spectrum profile may be estimated at each amplifier output using its tilt monitoring points and total measured output power. The linear spectrum profile may be scaled back at the amplifier input to estimate the incoming spectrum profile. The back-scaling is done considering amplifier modelling using calibrated gain-ripple and tilt information saved on the amplifier module. This case is described below.

Figure 17:
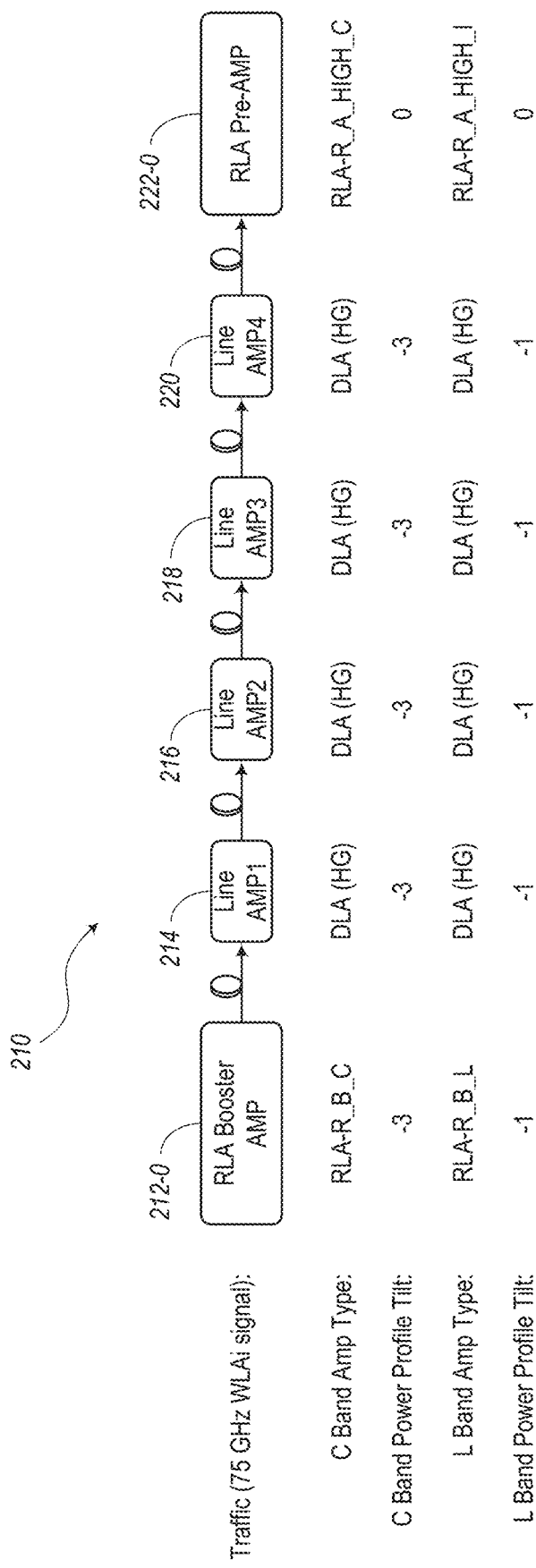
FIG. 17 is a diagram illustrating another photonic line system, according to various embodiments.

FIG. 17 is a diagram and chart of a system configuration of a photonic line system 210 with five fiber optical spans. For example, each span may be about 80 km long, may be configured as a Non-Dispersion Shifted Fiber (NDSF), and may be arranged between pairs of six adjacent amplifiers. The photonic line system 210 includes a Resonant Laser Ablation (RLA) booster amplifier 212-0, a first line amplifier 214, a second line amplifier 216, a third line amplifier 218, a fourth line amplifier 220, and an RLA pre-amplifier 222-0. The traffic on this photonic line system 210 may include 75 GHz WLAi signals. Information regarding the C-band amplifier type, C-band power profile tilt, L-band amplifier type, and L-band power profile tilt for each of the amplifiers are also shown in FIG. 17.

Figure 18A:
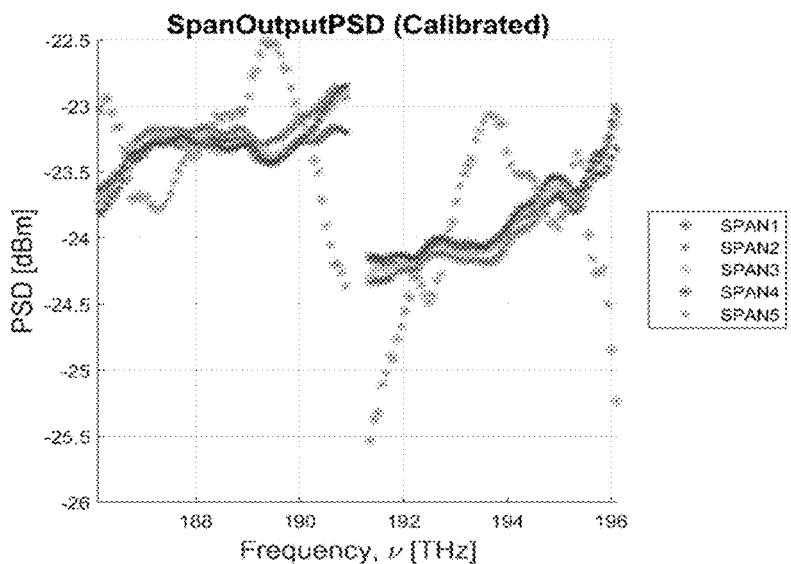
FIGS. 18a-18c are graphs illustrating how a calibrated or baseline span loss profile is calculated for the photonic line system of FIG. 17, according to various embodiments.
Figure 18B:
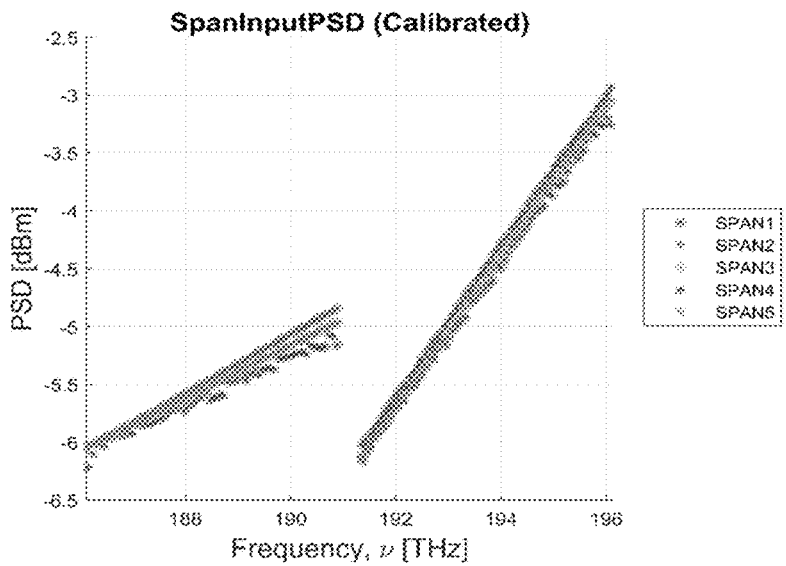
Figure 18C:
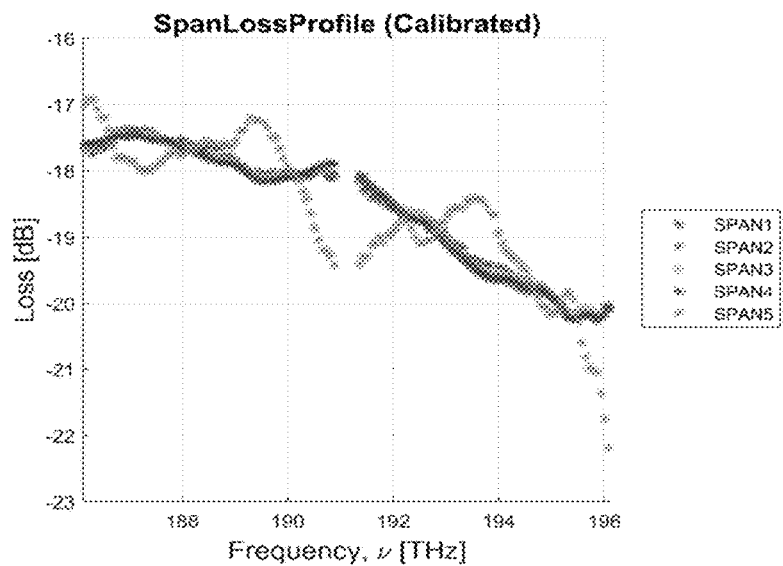

FIGS. 18a-18c shows an example of other graphs 230, 232, 234 obtained from an exemplary photonic line system (e.g., photonic line system 30, 210) tested under other conditions. Similar test results are also shown with respect to FIGS. 10a-10c, where similar measurements may be made. As mentioned with respect to FIGS. 10a-10c and as applicable with respect to FIGS. 18a-18c as well, FIGS. 18a-18c are graphs 230, 232, 234 illustrating an analysis of the five optical fiber spans between the amplifiers 212-0, 214, 216, 218, 220, 222-0 of the photonic line system 210 (or other system) when the photonic line system 210 is operating properly. The graph 230 of FIG. 18a shows the levels of PSD measured at the output of each of the fiber spans and the graph 232 of FIG. 18b shows the levels of the PSD measured at the input of each of the fiber spans. These measurements represent "calibrated" or "baseline" levels representing what signals may be expected on the photonic line system 210 when the photonic line system 210 is operating properly (without faults). The graph 234 of FIG. 18c is calculated by subtracting the Span Input (FIG. 18b) from the Span Output (FIG. 18a) and represents a Span Loss of each of the fiber spans when the photonic line system 210 is operating properly.

Figure 19A:
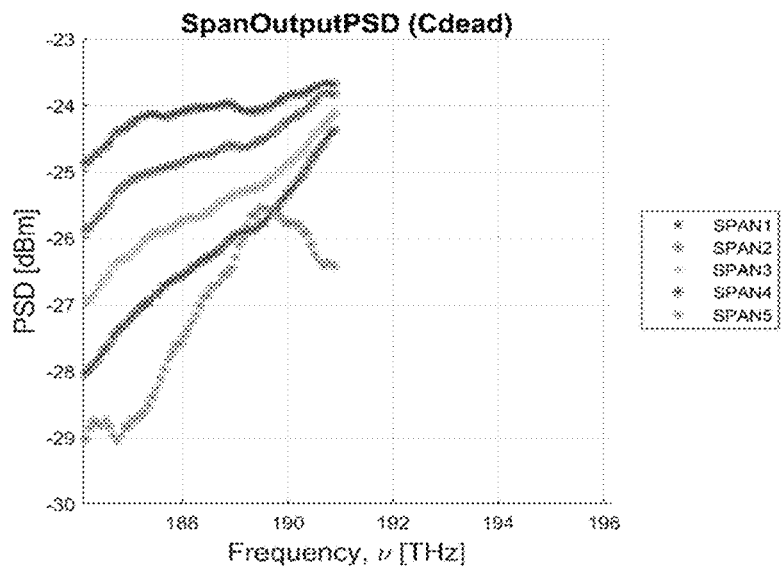
FIGS. 19a-19c are graphs illustrating how a span loss profile for the L-band is measured when the C-band is missing from the photonic line system of FIG. 17, according to various embodiments.
Figure 19B:
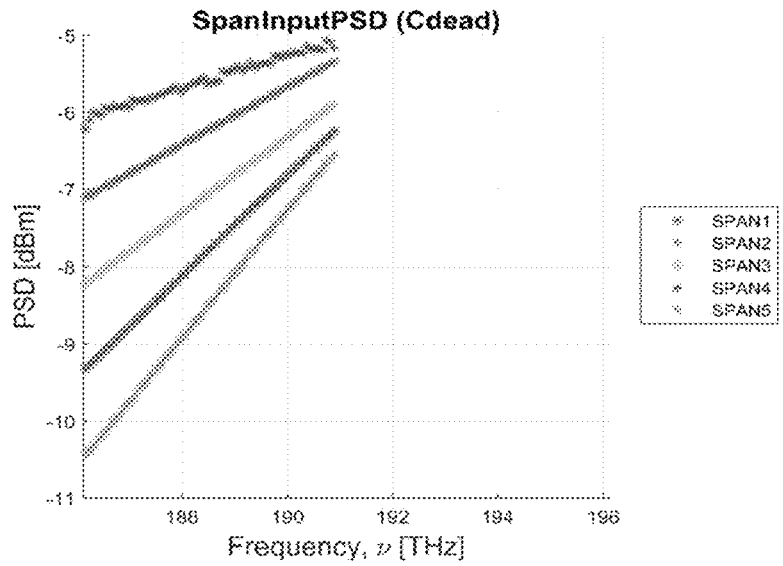
Figure 19C:
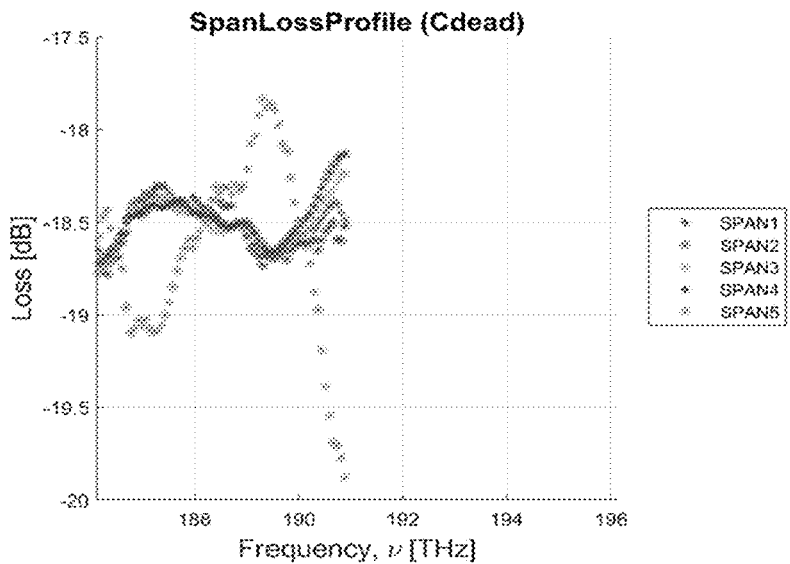
Figure 20A:
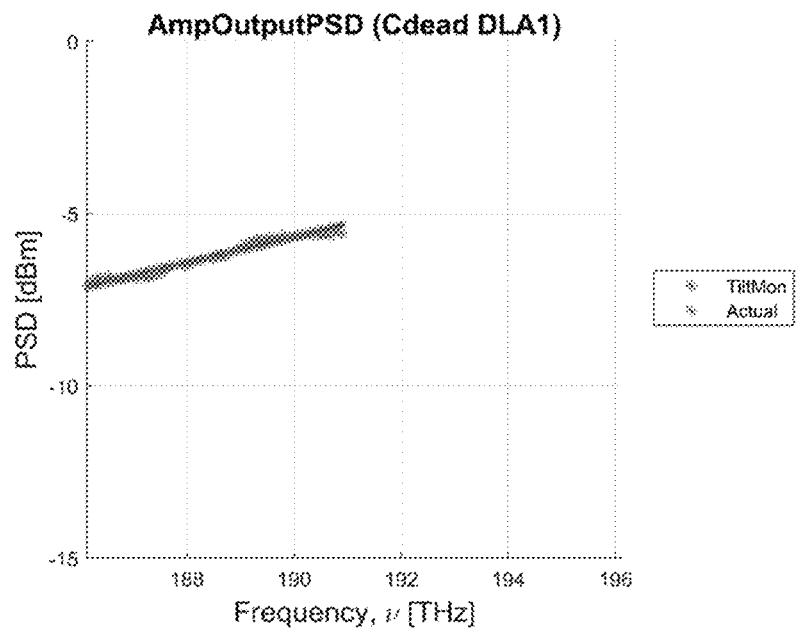
FIG. 20a-20d are graphs illustrating measurements and calculations of PSD and SNR at the output of the amplifiers of the photonic line system of FIG. 17 when the C-band is missing, according to various examples.
Figure 20B:
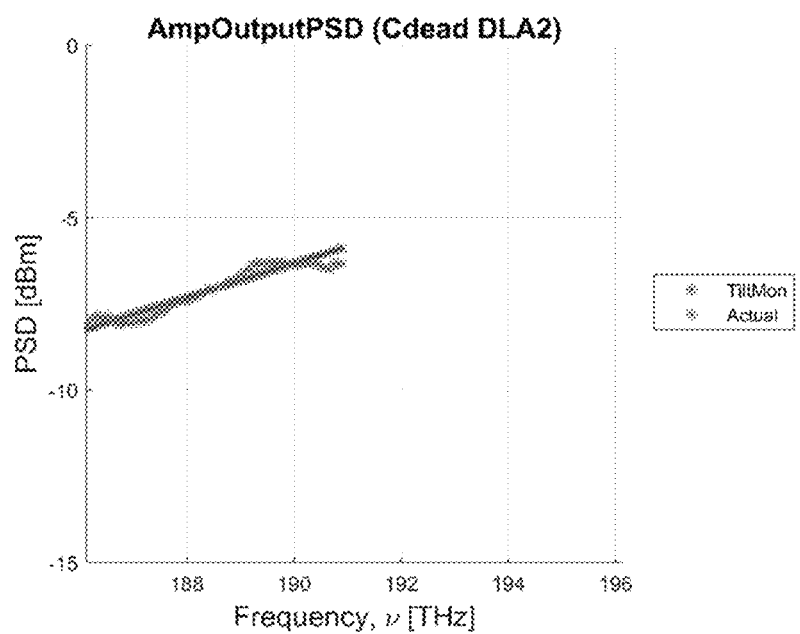
Figure 20C:
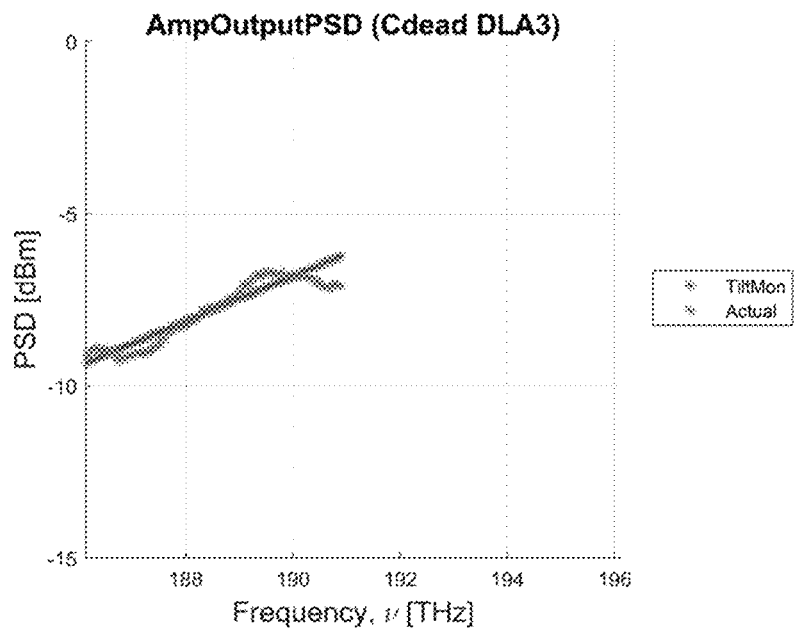
Figure 20D:
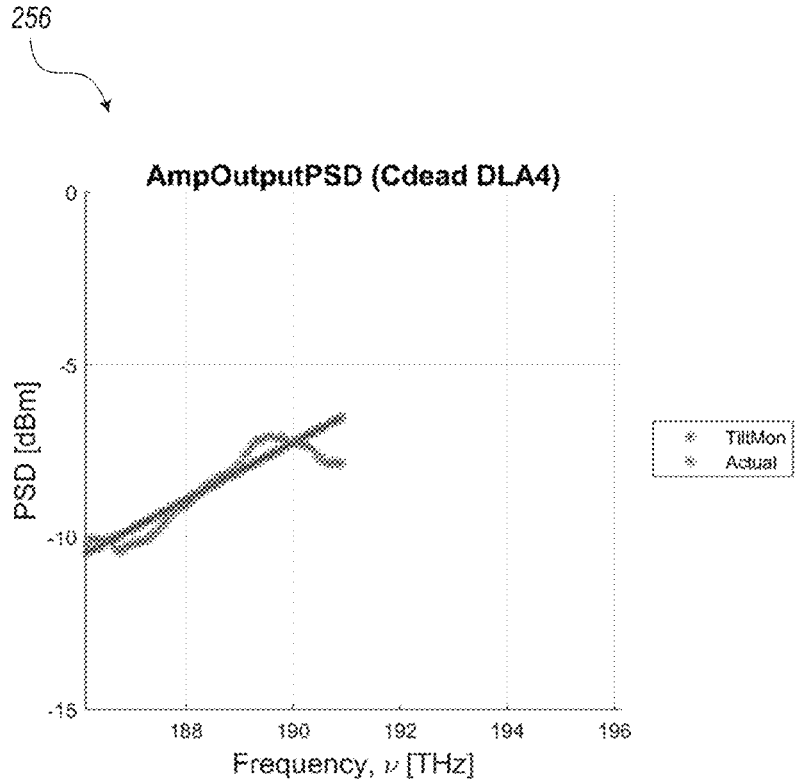
Figure 21A:
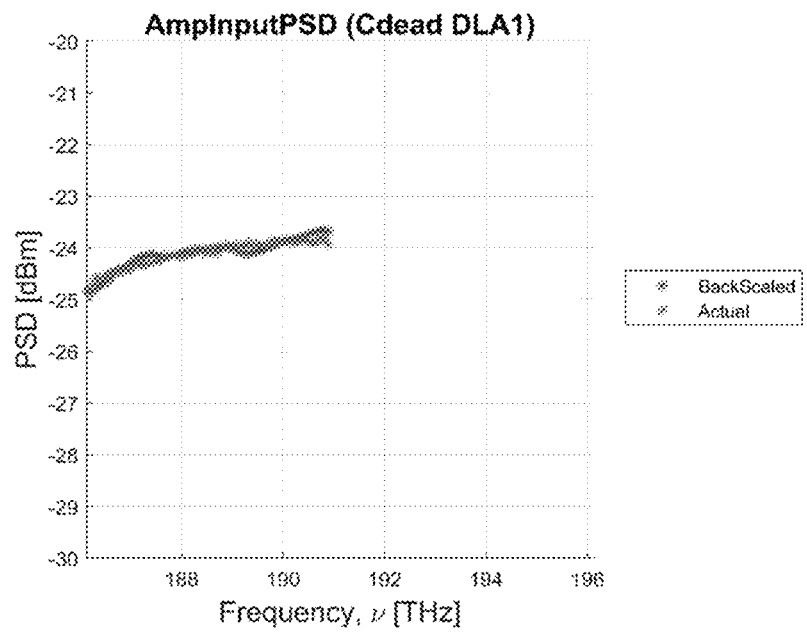
FIGS. 21a-21d are graphs illustrating measurements and calculations of PSD at the inputs of the amplifiers of the photonic line system of FIG. 17 when the C-band is missing, according to various examples.
Figure 21B:
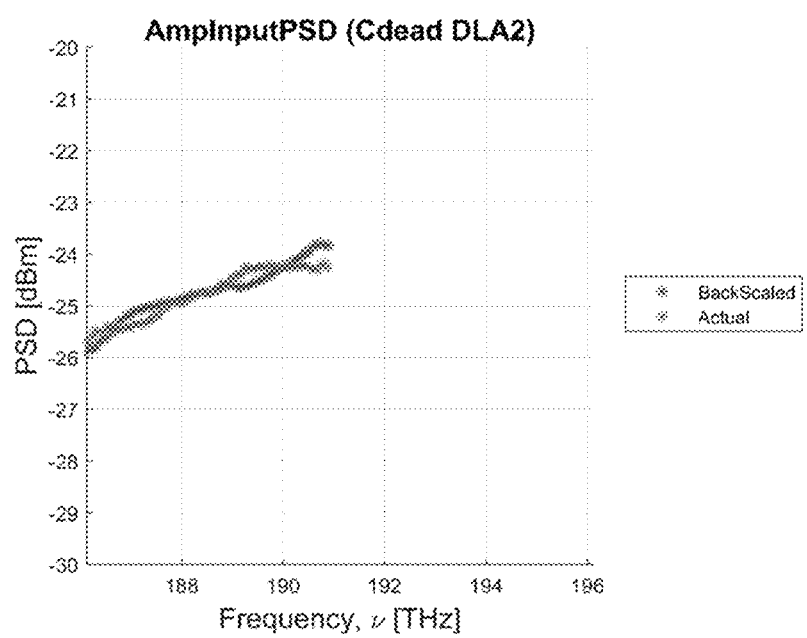
Figure 21C:
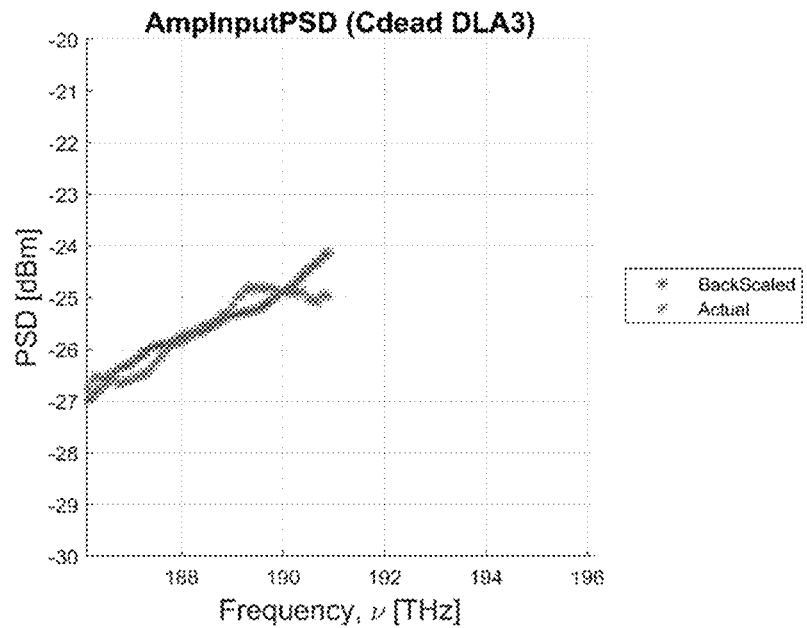
Figure 21D:
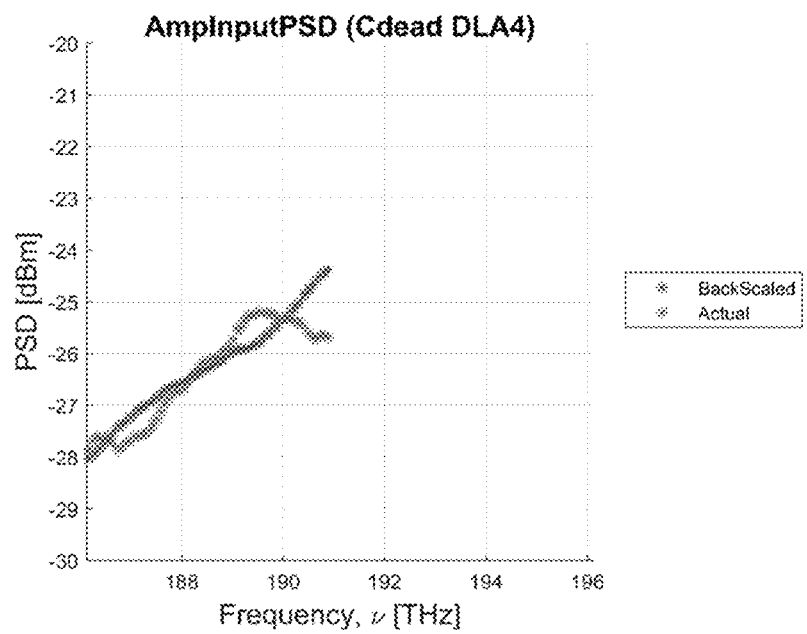

FIGS. 19a-19c represents another embodiment of measurements and calculations (similar to the situation described with respect to FIGS. 11a-11c) showing the span loss profile when the C-band is missing (dead). However, FIGS. 19a-19c include graphs 150, 152, 154 showing measurements and calculation executed with respect to the photonic line system 210 of FIG. 17, according to another embodiment.

FIGS. 19a-19c illustrate L-band signals over each of the fiber spans shown in FIG. 17 when there is a fault that causes the C-band to go missing in a Dual-Line Amplifier (DLA) implementation. FIG. 19a shows the span output and FIG. 19b shows the span input. It may be noted that the measured PSD differs from the calibrated or baseline levels for the L-band shown in FIGS. 18a and 18b. The Span Loss profile of the L-band (when the C-band is absent or "dead") is shown in the graph 244 of FIG. 19c. The Span Loss of the graph 244 is calculated as the difference between the output (FIG. 19a) and the input (FIG. 19b).

FIGS. 20a-20d includes graphs 250, 252, 254, 256 showing the PSD levels measured at the outputs of the amplifiers shown in FIG. 17. The amplifier spectrum profiles at the outputs of the amplifiers are derived from tilt monitoring of the amplifiers when the C-band is dead.

FIGS. 21a-21d includes graphs 260, 262, 264, 266 showing the PSD levels measured at the inputs of the amplifiers shown in FIG. 17. The estimated spectrum profiles at the inputs of the amplifiers are derived by back-scaling the output to its input when the C-band is dead.

Figure 22A:
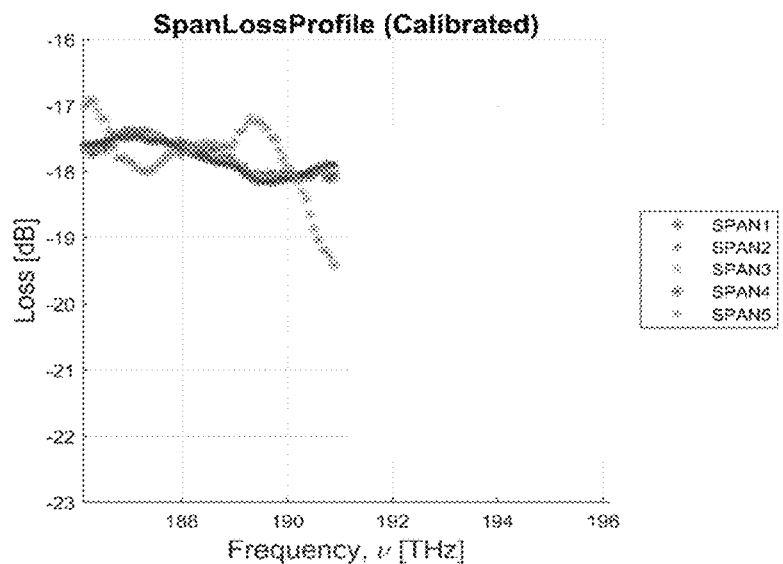
FIGS. 22a-22c are graphs illustrating how a target gain correction profile is calculated from the span loss profile of FIG. 19 when the C-band is missing, according to various embodiments of the present disclosure.
Figure 22B:
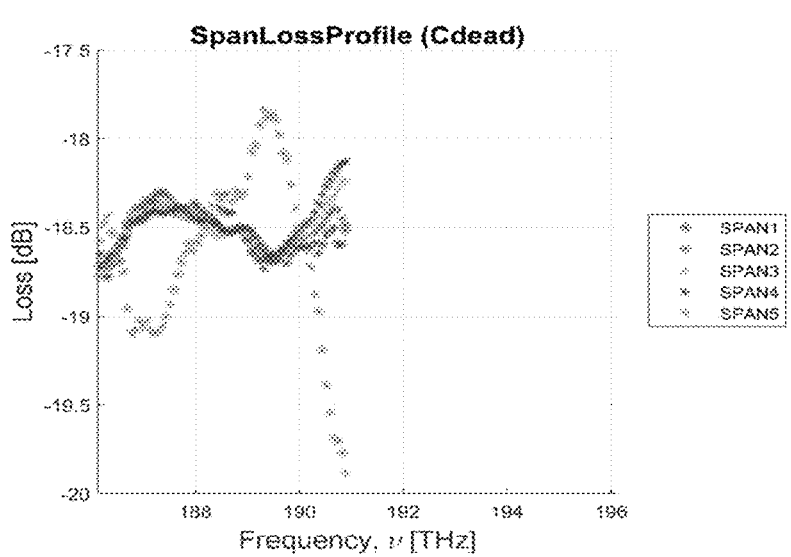
Figure 22C:
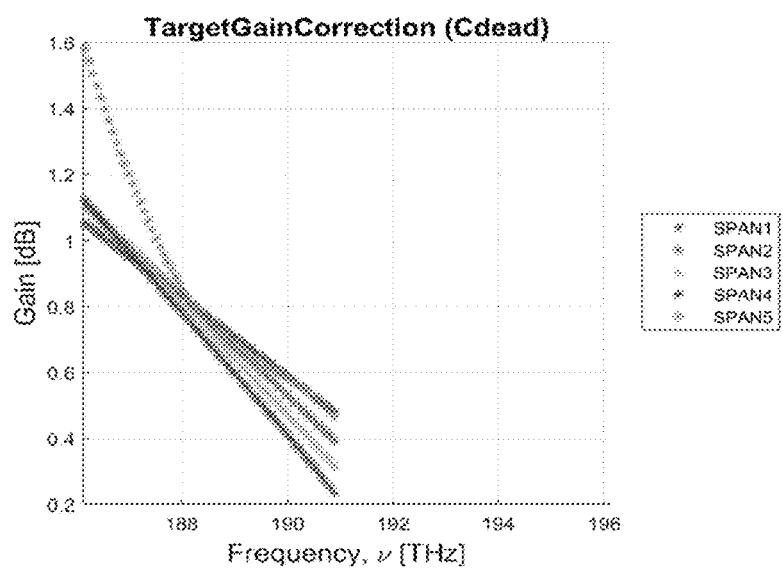

FIGS. 22a-22c show how a Target Gain Correction can be calculated (e.g., similar to the technique described above with respect to FIG. 12). In this embodiment, regarding measurements taken with respect to the photonic line system 210 of FIG. 17, profiles are obtained for each L-band amplifier when the C-band is dead. As shown in FIGS. 22a-22c, graphs 270, 272, 274 show the L-band signals over each of the fiber spans shown in FIG. 17.

The graph 270 of FIG. 22a shows a portion (e.g., the L-band portion) of the calibrated or baseline profile shown in the graph 234 of FIG. 18c representing what the L-band should look like when the photonic line system 210 is operating properly. However, when the C-band is missing, the Span Loss of the L-band is calculated and is displayed in graph 272 (i.e., as also shown in graph 244 of FIG. 19c). Thus, the actual measurements of the loss profile (FIG. 22b) can be compared with the baseline (e.g., ideal) loss profile (FIG. 22a). In order to compensate the L-band for this difference, the gain correction micro-service 28 of FIG. 1B may be used to determine what type of amplification correction may be needed at one or more of the respective amplifiers 212-0, 214, 216, 218, 220, 222-0 to get the L-band back to (or close to) the baseline levels. This compensation can be calculated by determining the difference between the loss profile of graph 270 and the loss profile of graph 272. Thus, the graph 274 shows a target gain correction profile for correcting the gain as needed to attempt to emulate the calibrated loss profile of the graph 270 of FIG. 22a. The gain correction of FIG. 22c may be applied to one or more of the optical amplifiers 212-0, 214, 216, 218, 220, 222-0 to get back to the baseline levels.

Figures 23A, 23B:
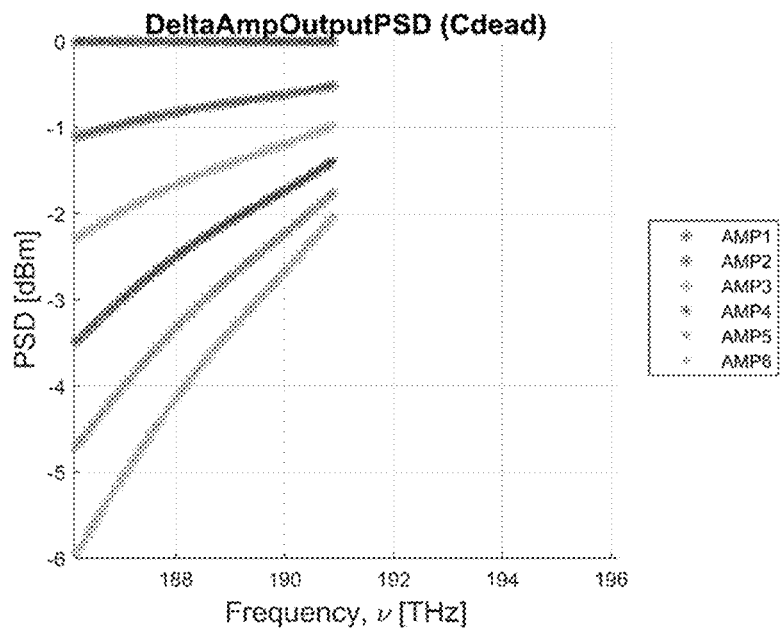
FIGS. 23a-23b are graphs illustrating measurements at the output of the amplifiers of the photonic line system of FIG. 17 when the C-band is missing, according to various embodiments.

FIGS. 23a-23b show graphs 280, 282 of calculations with respect to the outputs of the amplifiers shown in FIG. 17. The graphs 280, 282 include the changes (deltas) of the PSD and represent the Launch Profile and SNR penalty before a gain correction process is applied on account of the C-band being dead.

Figure 24A:
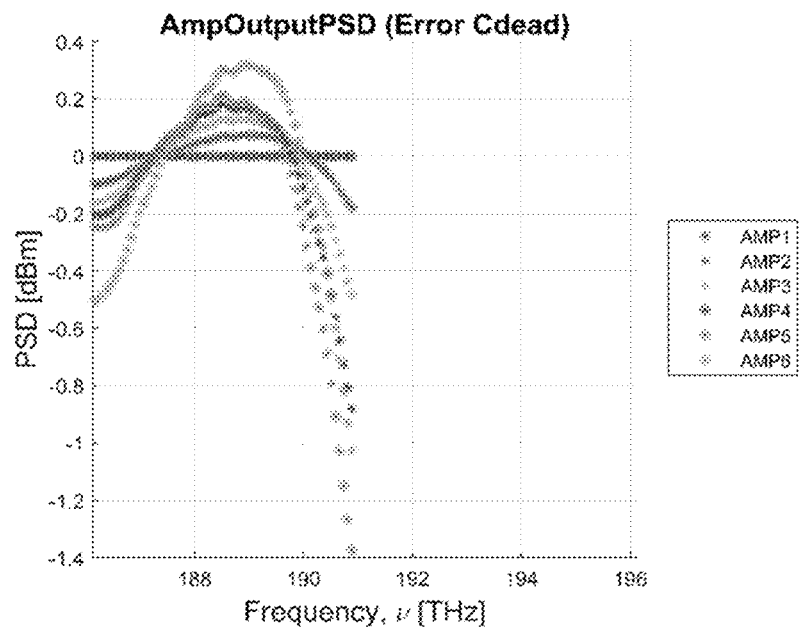
FIGS. 24a-24b are graphs illustrating measurements at the output of the amplifiers of the photonic line system of FIG. 17 when the C-band is missing, according to various embodiments.
Figure 24B:
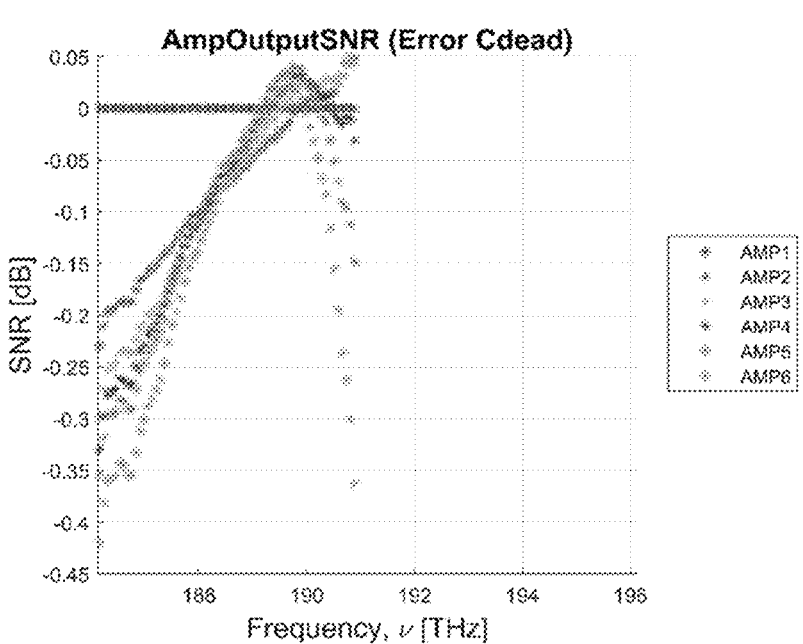

FIGS. 24a-24b show graphs 290, 292 of calculations with respect to the outputs of the amplifiers shown in FIG. 17. The graphs 280, 282 include the errors in the PSD and represent the Launch Profile and SNR penalty after a gain correction process is applied on account of the C-band being dead.

Figure 25:
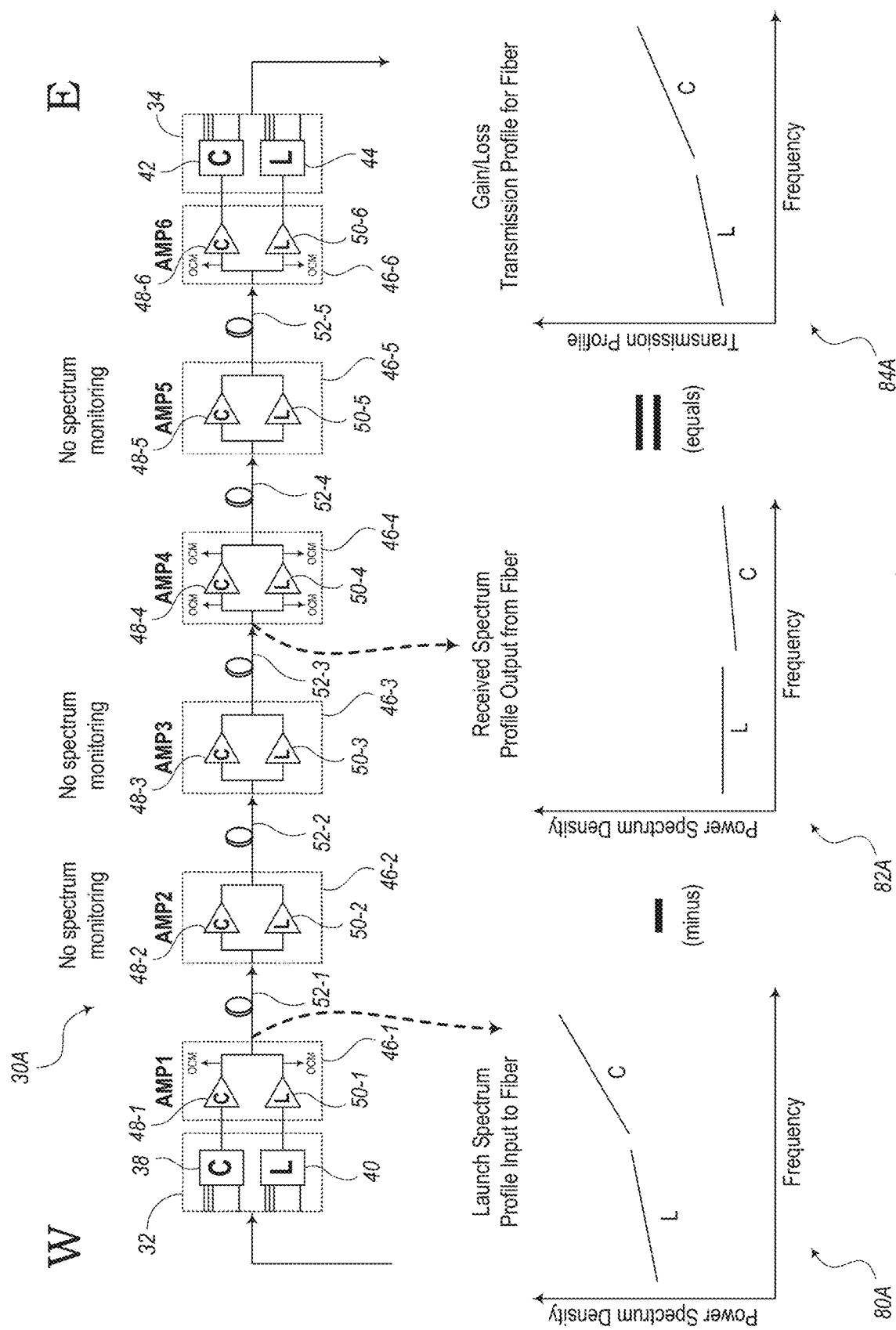
FIG. 25 is a schematic diagram and corresponding graphs illustrating measurements of cumulative transmission profiles over a plurality of fiber spans with no optical spectrum monitoring capabilities, according to various embodiments.

It is possible that a photonic line system may have consecutive fiber spans with no optical spectrum monitoring capabilities. Such an example of a photonic line system 30A is presented in FIG. 25, where spectrum monitoring capable optical amplifiers are placed in every 2× or 3× spans. In this example, the photonic line system 30A is configured such that OCM devices are present only in amplifiers 46-1, 46-4, 46-6, but are not present in amplifiers 46-2, 46-3, 46-5. In such a case, a cumulative transmission profile is saved as a baseline during calibration time when both C- and L-band are present over a plurality of fiber spans (e.g., 52-1, 52-2, 52-3) with no optical spectrum monitoring capabilities, and compared with a measured transmission profile when one of the C- or L-bands is impacted or missing. The net comparison error is then applied as a cumulative gain correction profile to a respective amplifier or distributed among the plurality of optical amplifiers in between.

To summarize the various aspects of the present disclosure, gain correction can be applied to the amplifiers to account for variances measured in the amplifiers or fiber spans when one of the bands is missing. The gain corrections are calculated to compensate for the variances with respect to baseline levels. For the case where the C-band is dead, the PSD penalty may be reduced by the gain correction functionality of the present disclosure from 6 dB to 1 dB. The embodiments of the present disclosure are also configured to reduce the SNR penalty from 2.5 dB to 0.4 dB for L-band channels with the gain correction described herein. For the case of the L-band being dead, the PSD penalty may be reduced from 1.0 dB to 0.6 dB. In some situations, there may be no SNR penalty for L-band channels with gain correction.

According to yet another embodiment, an alternate implementation of a method may include a sequential approach. For instance, instead of an independent nodal controller solution, another embodiment may be configured to utilize a sequential control approach. In such an implementation, a local controller (e.g., control device 10) can detect the band failure (e.g., hardware failures, failures detected by OCM monitoring, etc.) and can trigger a gain profile update on the local amplifier for the surviving band to match its target launch power profile to the downstream fiber.

For example, when a hardware failure occurs, the present systems may provide a CP fail notification for a given band of spectrum. OCM monitoring failures may include indicating a valid spectrum power measurement available at an input matching a previously saved calibrated input profile baseline for a given band. There may be no power or very low power coming out of the output of the amplifier module. The delta in the power profile between an input and output of an amplifier for a given band can indicate silent pump failures.

The local controller (e.g., control device 10) may send a token to a downstream node following the completion of its gain profile update when there is fault detected on the respective node. A downstream nodal controller may detect a band failure both at its input and output spectrum monitoring locations. However, in this embodiment, the local controller may not necessarily apply a gain profile update to its local amplifier for the surviving band until a token or notification is received from the upstream node.

The methods of the present disclosure may allow a sequential update on the amplifier gain profiles for the surviving band, where each gain profile may be adjusted to re-align the currently measured launch power profile to a previously calibrated target launch power profile. The sequential approach may also support the configuration where some selected amplifiers may have OCM capabilities in few selected spans. In this case, a local controller will not make any change on a node that has no spectrum monitoring abilities but will pass on any token or notification received from upstream node. The local controller running on a node with spectrum monitoring may be configured to only make a change when it receives a token or notification from an immediate upstream controller.

Another solution may be implemented for a sectional controller if there is no OCM per span. Specifically, if each fiber span is not equipped with spectrum monitoring capabilities, and the spectrum monitoring is only available at the ingress and egress of an OADM section, then a loss of band has to be detected at the end of the section or at the next available spectrum monitoring location. A local controller can monitor the spectrum condition, and apply the cumulative correction on a single amplifier with allowable dynamic ranges. It will also be possible to implement an end-to-end sectional controller solution that will monitor the spectrum, and will linearly apply the correction to all downstream amplifiers (e.g., EDFAs) of the surviving band in the section following the failure notification (e.g., HW CP fail).

The following benefits may be realized with the application of the systems and methods described in the present disclosure. In a C+L band photonic line system, failure of any amplifier for a specific band (such as C-band or L-band) may normally be catastrophic for the traffic in the other band. Especially in the case where a C-band amplifier dies, the traffic in the L-band will usually not survive. Hence, a protection mechanism to recover L-band traffic due to failure in the C-band may be needed for many customers before deploying the C+L solutions in the field.

The recovery mechanisms of the present disclosure may enable a C+L line system to execute a fast recovery from failures that would normally affect services negatively. The recovery may be performed to correct failures with minimal east-west communications dependency and may be performed without the need for an external agent or an end-to-end controller solution. The solutions herein may be applied in existing photonic line system having amplifiers and spectrum monitoring capabilities available for Reconfigurable Line Systems (RLSs) without any further external monitoring equipment.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A control device for controlling an optical amplifier of a C+L band photonic line system, the control device comprising
   a processing device, and
   a memory device configured to store a C+L traffic managing module for controlling C-band and L-band traffic in the C+L band photonic line system,
   wherein the C+L traffic managing module, when executed, is configured to cause the processing device to
      calculate a gain correction profile based on a difference between a saved baseline transmission profile and a measured transmission profile of a surviving band of a C+L band photonic line system over a preceding fiber span when at least one band of the C+L band photonic line system is missing or impacted, apply the gain correction profile to a respective optical amplifier of the C+L band photonic line system to compensate for the difference, and save the baseline transmission profile for every fiber span when the C+L band photonic line system is operating properly and C-band signals and L-band signals are both present on the C+L band photonic line system, whereby a transmission profile for a fiber span is the difference between a launch power spectrum profile at an input to the fiber span and a received power spectrum profile at an output of the fiber span.

2. The control device of claim 1, wherein the gain correction profile adjusts the respective optical amplifier to compensate for inconsistencies experienced in the surviving band when a fault is detected in the other band.

3. The control device of claim 2, wherein the gain correction profile is configured to adjust one or more of tilt and gain of the respective optical amplifier.

4. The control device of claim 1, wherein the C+L traffic managing module includes an optical channel monitoring micro-service, a baseline calculation micro-service, a gain correction micro-service, and an amplifier compensation micro-service, wherein the optical channel monitoring micro-service includes an absence detection unit and a transmission measurement unit, wherein the absence detection unit is configured to detect if one of the C-band and L-band is missing or impacted, and wherein the transmission measurement unit is configured to measure a spectrum transmission profile of the surviving band.

5. The control device of claim 1, wherein the C+L band photonic line system includes a plurality of optical amplifiers and a plurality of fiber optic spans arranged between adjacent pairs of optical amplifiers, and wherein each of the optical amplifiers includes a C-band amplifying device and an L-band amplifying device.

6. The control device of claim 5, further comprising a plurality of Optical Channel Monitoring (OCM) devices configured to measure a Power Spectrum Density (PSD) at an input and output of each of the C-band amplifying devices and L-band amplifying devices of the plurality of optical amplifiers.

7. A control device for controlling an optical amplifier of a C+L band photonic line system, the control device comprising a processing device, and a memory device configured to store a C+L traffic managing module for controlling C-band and L-band traffic in the C+L band photonic line system, wherein the C+L traffic managing module, when executed, is configured to cause the processing device to calculate a gain correction profile based on a difference between a saved baseline transmission profile and a measured transmission profile of a surviving band of a C+L band photonic line system over a preceding fiber span when at least one band of the C+L band photonic line system is missing or impacted, and apply the gain correction profile to a respective optical amplifier of the C+L band photonic line system to compensate for the difference, wherein the C+L traffic managing module includes an optical channel monitoring micro-service, a baseline calculation micro-service, a gain correction micro-service, and an amplifier compensation micro-service, wherein the optical channel monitoring micro-service includes an absence detection unit and a transmission measurement unit, wherein the absence detection unit is configured to detect if one of the C-band and L-band is missing or impacted, and wherein the transmission measurement unit is configured to measure a spectrum transmission profile of the surviving band.

8. The control device of claim 7, wherein the C+L traffic managing module is further configured to cause the processing device to save the baseline transmission profile for every fiber span when the C+L band photonic line system is operating properly and C-band signals and L-band signals are both present on the C+L band photonic line system, whereby a transmission profile for a fiber span is the difference between a launch power spectrum profile at an input to the fiber span and a received power spectrum profile at an output of the fiber span.

9. The control device of claim 7, wherein the gain correction profile adjusts the respective optical amplifier to compensate for inconsistencies experienced in the surviving band when a fault is detected in the other band.

10. The control device of claim 9, wherein the gain correction profile is configured to adjust one or more of tilt and gain of the respective optical amplifier.

11. The control device of claim 7, wherein the C+L band photonic line system includes a plurality of optical amplifiers and a plurality of fiber optic spans arranged between adjacent pairs of optical amplifiers, and wherein each of the optical amplifiers includes a C-band amplifying device and an L-band amplifying device.

12. The control device of claim 7, further comprising a plurality of Optical Channel Monitoring (OCM) devices configured to measure a Power Spectrum Density (PSD) at an input and output of each of the C-band amplifying devices and L-band amplifying devices of the plurality of optical amplifiers.

13. A control device for controlling an optical amplifier of a C+L band photonic line system, the control device comprising a processing device, a memory device configured to store a C+L traffic managing module for controlling C-band and L-band traffic in the C+L band photonic line system, wherein the C+L traffic managing module, when executed, is configured to cause the processing device to calculate a gain correction profile based on a difference between a saved baseline transmission profile and a measured transmission profile of a surviving band of a C+L band photonic line system over a preceding fiber span when at least one band of the C+L band photonic line system is missing or impacted, and apply the gain correction profile to a respective optical amplifier of the C+L band photonic line system to compensate for the difference, wherein the C+L band photonic line system includes a plurality of optical amplifiers and a plurality of fiber optic spans arranged between adjacent pairs of optical amplifiers, and wherein each of the optical amplifiers includes a C-band amplifying device and an L-band amplifying device, and a plurality of Optical Channel Monitoring (OCM) devices configured to measure a Power Spectrum Density (PSD) at an input and output of each of the C-band amplifying devices and L-band amplifying devices of the plurality of optical amplifiers.

14. The control device of claim 13, wherein the C+L traffic managing module is further configured to cause the processing device to save the baseline transmission profile for every fiber span when the C+L band photonic line system is operating properly and C-band signals and L-band signals are both present on the C+L band photonic line system, whereby a transmission profile for a fiber span is the difference between a launch power spectrum profile at an input to the fiber span and a received power spectrum profile at an output of the fiber span.

15. The control device of claim 13, wherein the gain correction profile adjusts the respective optical amplifier to compensate for inconsistencies experienced in the surviving band when a fault is detected in the other band.

16. The control device of claim 15, wherein the gain correction profile is configured to adjust one or more of tilt and gain of the respective optical amplifier.

17. The control device of claim 13, wherein the C+L traffic managing module includes an optical channel monitoring micro-service, a baseline calculation micro-service, a gain correction micro-service, and an amplifier compensation micro-service, wherein the optical channel monitoring micro-service includes an absence detection unit and a transmission measurement unit, wherein the absence detection unit is configured to detect if one of the C-band and L-band is missing or impacted, and wherein the transmission measurement unit is configured to measure a spectrum transmission profile of the surviving band.

\* \* \* \* \*